(12) United States Patent
Chiang et al.

(10) Patent No.: US 11,175,641 B2
(45) Date of Patent: Nov. 16, 2021

(54) PROCESSING PLATFORM WITH HOLOMORPHIC EMBEDDING FUNCTIONALITY FOR POWER CONTROL AND OTHER APPLICATIONS

(71) Applicant: Cornell University, Ithaca, NY (US)

(72) Inventors: Hsiao-Dong Chiang, Ithaca, NY (US); Tao Wang, Ithaca, NY (US)

(73) Assignee: Cornell University, Ithaca, NY (US)

( * ) Notice: Subject to any disclaimer, the term of this patent is extended or adjusted under 35 U.S.C. 154(b) by 89 days.

(21) Appl. No.: 16/523,648

(22) Filed: Jul. 26, 2019

(65) Prior Publication Data

US 2020/0050159 A1 Feb. 13, 2020

Related U.S. Application Data

(60) Provisional application No. 62/717,399, filed on Aug. 10, 2018.

(51) Int. Cl.
*G05B 19/042* (2006.01)
*G06F 17/12* (2006.01)

(52) U.S. Cl.
CPC .......... *G05B 19/042* (2013.01); *G06F 17/12* (2013.01); *G05B 2219/2639* (2013.01)

(58) Field of Classification Search
CPC .......... G05B 19/042; G05B 2219/2639; G06F 17/12; Y02P 90/02
See application file for complete search history.

(56) References Cited

U.S. PATENT DOCUMENTS

| | | | |
|---|---|---|---|
| 2014/0156094 A1* | 6/2014 | Trias | H02J 13/00017 700/291 |
| 2017/0003330 A1* | 1/2017 | Trias | G06F 17/11 |

(Continued)

OTHER PUBLICATIONS

"Chengxi Liu et al., A Multi-Dimensional Holomorphic Embedding Method to Solve AC Power Flows, IEEE, vol. 5, 2017, Digital Object Identifier 10.1109/ACCESS.2017.2768958, pp. 2570-2585" (Year: 2017).*

(Continued)

*Primary Examiner* — Santosh R Poudel
(74) *Attorney, Agent, or Firm* — Ryan, Mason & Lewis, LLP

(57) ABSTRACT

An apparatus comprises at least one processing device comprising a processor coupled to a memory. The at least one processing device is configured to obtain a system of nonlinear equations characterizing a physical system, to construct a flexible embedded system from the system of nonlinear equations, wherein the flexible embedded system is configurable with any of a plurality of arbitrary reference states as respective starting points, to utilize the flexible embedded system to generate at least one output providing a solution to the system of nonlinear equations, and to establish one or more operating parameters of the physical system based at least in part on the output generated utilizing the flexible embedded system. The physical system is configured in accordance with the one or more established operating parameters. The physical system in some embodiments illustratively comprises an electric power system, an integrated circuit, or another type of electrical or electronic system or circuit.

20 Claims, 17 Drawing Sheets

(56) References Cited

U.S. PATENT DOCUMENTS

| | | | | |
|---|---|---|---|---|
| 2018/0158152 A1* | 6/2018 | Jereminov | ............... | H02J 3/16 |
| 2020/0021133 A1* | 1/2020 | Liu | ................... | G01R 19/2513 |

OTHER PUBLICATIONS

L.M. Castro et al., "Solution of Power Flow with Automatic Load-Frequency Control Devices Including Wind Farms," IEEE Transactions on Power Systems, Nov. 2012, pp. 2186-2195, vol. 27, No. 4.

A. Trias et al., "The Holomorphic Embedding Loadflow Method for DC Power Systems and Nonlinear DC Circuits," IEEE Transactions on Circuits and Systems 1: Regular Papers, Feb. 2016, pp. 322-333, vol. 63, No. 2.

S.D. Rao et al., "Estimating the Saddle-Node Bifurcation Point of Static Power Systems Using the Holomorphic Embedding Method," International Journal of Electrical Power & Energy Systems, Jan. 2017, pp. 1-12, vol. 84.

H.-D. Chiang et al., "CPFLOW: A Practical Tool for Tracing Power System Steady-State Stationary Behavior Due to Load and Generation Variations," IEEE Transactions on Power Systems, May 1995, pp. 623-634, vol. 10, No. 2.

Antonio Trias, "The Holomorphic Embedding Load Flow Method," IEEE Power and Energy Society General Meeting, Jul. 22-26, 2012, pp. 1-8.

Federico Milano, "Continuous Newton's Method for Power Flow Analysis," IEEE Transactions on Power Systems, Feb. 2009, pp. 50-57, vol. 24, No. 1.

S. Rao et al., "The Holomorphic Embedding Method Applied to the Power-Flow Problem," IEEE Transactions on Power Systems, Sep. 2016, pp. 3816-3828, vol. 31, No. 5.

C. Liu et al., "Real-Time Voltage Stability Assessment for Load Areas Based on the Holomorphic Embedding Method," arXIV 1702.01464, Feb. 2017, 8 pages.

C. Liu et al., "Online Voltage Stability Assessment for Load Areas Based on the Holomorphic Embedding Method," IEEE Transactions on Power Systems, Jul. 2018, pp. 3720-3734, vol. 33, No. 4.

M. Dolan et al., "Distribution Power Flow Management Utilizing an Online Optimal Power Flow Technique," IEEE Transactions on Power Systems, May 2012, pp. 790-799, vol. 27, No. 2.

Brian Stott, "Review of Load-Flow Calculation Methods," Proceedings of the IEEE, Jul. 1974, pp. 916-929, vol. 62, No. 7.

A. Gómez-Expósito et al., "Factorized Load Flow," IEEE Transactions on Power Systems, Nov. 2013, pp. 4607-4614, vol. 28, No. 4.

J.S. Thorp et al., "Load-Flow Fractals Draw Clues to Erratic Behaviour," IEEE Computer Applications in Power, Jan. 1997, pp. 59-62, vol. 10, No. 1.

P.W. Sauer, "Explicit Load Flow Series and Functions," IEEE Transactions on Power Apparatus and Systems, Aug. 1981, pp. 3754-3763, vol. PAS-100, No. 8.

K. Yamamura et al., "A Fixed-Point Homotopy Method for Solving Modified Nodal Equations," IEEE Transactions on Circuits and Systems I: Fundamental Theory and Applications, Jun. 1999, pp. 654-665, vol. 46, No. 6.

H.-D.Chiang et al., "Homotopy-Enhanced Power Flow Methods for General Distribution Networks with Distributed Generators," IEEE Transactions on Power Systems, Jan. 2014, pp. 93-100, vol. 29, No. 1.

J.-J. Deng et al., "Newton Method and Trajectory-Based Method for Solving Power Flow Problems: Nonlinear Studies," International Journal of Bifurcation and Chaos, Jun. 15, 2015, 24 pages, Article 1530018, vol. 25, No. 6.

M. Dolan et al., "Distribution Power Flow Management Utilising an Online Optimal Power Flow Technique," IEEE Power and Energy Society General Meeting, Jul. 22-26, 2012, 1 page.

Y. Ju, "Holomorphic Embedding Load Flow Modeling of the Three-phase Active Distribution Network," Preprints 2018, 2018030066 (doi: 10.20944/preprints201803.0066.v1), 7 pages.

A. J. Wood et al., "Power Generation, Operation, and Control," Second Edition, New York, NY, US, Wiley, 1996.

W. F. Tinney et al., "Power flow solution by Newton's method," IEEE Transactions on Power Apparatus and Systems, PAS-86, No. 11, Nov. 1967, pp. 1449-1460.

C. Liu et al., "Probabilistic Power Flow Analysis Using Multidimensional Holomorphic Embedding and Generalized Cumulants," IEEE Transactions on Power Systems, vol. 33, No. 6, Nov. 2018, pp. 7132-7142.

S. Rao et al., "Two-Bus Holomorphic Embedding Method-based Equivalents and Weak-Bus Determination," arXiv:1706.01298, Jun. 2017, 4 pages.

C. Liu et al., "A Multi-Dimensional Holomorphic Embedding Method to Solve AC Power Flows," IEEE Access, Dec. 5, 2017, p. 25270-25285.

B. Wang et al., "Multi-Stage Holomorphic Embedding Method for Calculating the Power-Voltage Curve," arXiv:1705.01981, May 2017, 2 pages.

A. Trias, "HELM: The Holomorphic Embedding Load-Flow Method. Foundations and Implementations," Foundations and Trends in Electric Energy Systems, vol. 3, No. 3-4, May 2018, pp. 140-370.

S. W. McDonald et al.., "Fractal Basin Boundaries," Physica D, vol. 17, No. 2, Apr. 1985, pp. 125-153.

M. Ehrgott et al., "An MCDM Approach to Portfolio Optimization," European Journal of Operational Research, vol. 155(3), 2004, pp. 752-770.

P. Gonnet et al., "Robust Pade Approximation via SVD," SIAM Review, vol. 55, No. 1, 2013, pp. 101-117.

S. S. Baghsorkhi et al., "Embedding AC power Flow in the Complex Plane, Part I: Modelling and Mathematical Foundation," arXiv: 1604.03425, Jul. 2016, 14 pages.

S. S. Baghsorkhi et al., "Embedding AC Power Flow in the Complex Plane, Part II: A Reliable Framework for Voltage Collapse Analysis," arXiv: 1609.01211, Sep. 2016, 11 pages.

H. D. Chiang et al., "A Novel Fast and Flexible Holomorphic Embedding Power Flow Method," IEEE Transactions on Power Systems, vol. 33, No. 3, May 2018, pp. 2551-2562.

I. Wallace et al., "Alternative PV Bus Modelling with the Holomorphic Embedding Load Flow Method," arXiv: 1607.00163, Jul. 2016, 11 pages.

M. Basiri-Kejani et al., "Holomorphic Embedding Load-Flow Modeling of Thyristor-Based FACTS Controllers," IEEE Transactions on Power Systems, vol. 32, No. 6, Nov. 2017, pp. 4871-4879.

R. Remmert, "Theory of Complex Functions," R. B. Burckel ed. New York, NY, USA: Springer, 1991.

D. Coppersmith et al., "Matrix Multiplication via Arithmetic Progressions," J. Symbolic Computation, vol. 9, No. 3, 1990 pp. 251-280.

S. Cabay et al., "A Superfast Algorithm for Multi-Dimensional Pade Systems," Numerical Algorithms, vol. 2, No. 2, 1992, pp. 201-224.

H. S. Kasana et al., "Introductory Operations Research: Theory and Applications," Berlin, Germany, Springer-Verlag, 2004.

R. D. Zimmerman et al., "MATPOWER: Steady-state Operations, Planning and Analysis Tools for Power Systems Research and Education," IEEE Transactions on Power Systems, vol. 26, No. 1, Feb. 2011, pp. 12-19.

C. Josz et al., "AC Power Flow Data in MATPOWER and QCQP Format: iTesla, RTE Snapshots, and PEGASE," arXiv: 1603.01533, Mar. 2016, 7 pages.

* cited by examiner

PROCESSING PLATFORM WITH HOLOMORPHIC EMBEDDING FUNCTIONALITY FOR POWER CONTROL AND OTHER APPLICATIONS

PRIORITY CLAIM

The present application claims priority to U.S. Provisional Patent Application Ser. No. 62/717,399, filed Aug. 10, 2018 and entitled "Processing Platform with Holomorphic Embedding Functionality for Power Control and Other Applications," which is incorporated by reference herein in its entirety.

STATEMENT OF GOVERNMENT SUPPORT

This invention was made with government support under Contract No. 1508986 awarded by the National Science Foundation (NSF). The government has certain rights in this invention.

FIELD

The field relates generally to information processing, and more particularly to techniques for controlling system components.

BACKGROUND

Power flow calculations are frequently performed to guide power system operations and planning. The prevailing power flow methods are mainly based on numerical iterative techniques, such as the Newton-Raphson (NR) and fast-decoupled (FD) Newton power flow methods, and NR variants. These iterative methods have significant drawbacks, such as divergence or slow convergence. For example, power flow divergence remains a challenging issue, and this issue has been aggravated by the emergence of new control devices and renewable energy. These and other issues have created an urgent need for more robust power flow solvers. Similar issues arise in numerous other applications requiring solution of systems of nonlinear equations, such as integrated circuits.

SUMMARY

Illustrative embodiments implement functionality for holomorphic embedding power flow for controlling power system components, such as electrical equipment of a power distribution system of an electric power utility. Other embodiments apply holomorphic embedding techniques in other types of component control applications. For example, some embodiments implement holomorphic embedding techniques to establish a direct current (DC) operating point of an integrated circuit.

Such embodiments advantageously meet the above-identified need by overcoming the significant drawbacks of conventional practice, such as divergence and/or slow convergence of the NR and FD Newton power flow methods.

In one embodiment, an apparatus comprises at least one processing device comprising a processor coupled to a memory. The at least one processing device is configured to obtain a system of nonlinear equations characterizing a physical system, to construct a flexible embedded system from the system of nonlinear equations, wherein the flexible embedded system is configurable with any of a plurality of arbitrary reference states as respective starting points, to utilize the flexible embedded system to generate at least one output providing a solution to the system of nonlinear equations, and to establish one or more operating parameters of the physical system based at least in part on the output generated utilizing the flexible embedded system. The physical system is configured in accordance with the one or more established operating parameters. For example, configuring the physical system in accordance with the one or more established operating parameters illustratively comprises generating a control signal for controlling at least one component of the physical system in accordance with the one or more established operating parameters.

The physical system in some embodiments illustratively comprises an electric power system, an integrated circuit, or another type of electrical or electronic system or circuit. Other types of physical systems can be used in other embodiments.

Some illustrative embodiments disclosed herein provide flexible embedded systems and an associated fast and flexible holomorphic embedding (FFHE) method for solving nonlinear equations, such as power flow (PF) equations. The flexible embedded systems and associated FFHE method can be used in a wide variety of applications, including in the context of solving PF equations to provide accurate and efficient control of power system components, and numerous other types of controlled components in other applications. Some implementations of FFHE are non-iterative, perform tens to hundreds of times faster than traditional holomorphic embedding methods, and can be used to guide other methods for solving nonlinear equations, including the Gauss-Seidel method and variants of Newton's method, to overcome divergence issues and improve the rate of convergence by two times or more. Practical applications involving tens of thousands of nonlinear equations have been simulated to demonstrate the performance of illustrative embodiments of the FFHE method.

These and other embodiments of the invention include but are not limited to systems, methods, apparatus, processing devices, integrated circuits, and processor-readable storage media having software program code embodied therein.

DETAILED DESCRIPTION

Embodiments of the invention can be implemented, for example, in the form of information processing systems comprising one or more processing platforms each having at least one computer, server or other processing device. Illustrative embodiments of such systems will be described in detail herein. It should be understood, however, that embodiments of the invention are more generally applicable to a wide variety of other types of information processing systems and associated computers, servers or other processing devices or other components. Accordingly, the term "information processing system" as used herein is intended to be broadly construed so as to encompass these and other arrangements.

Figure 1:
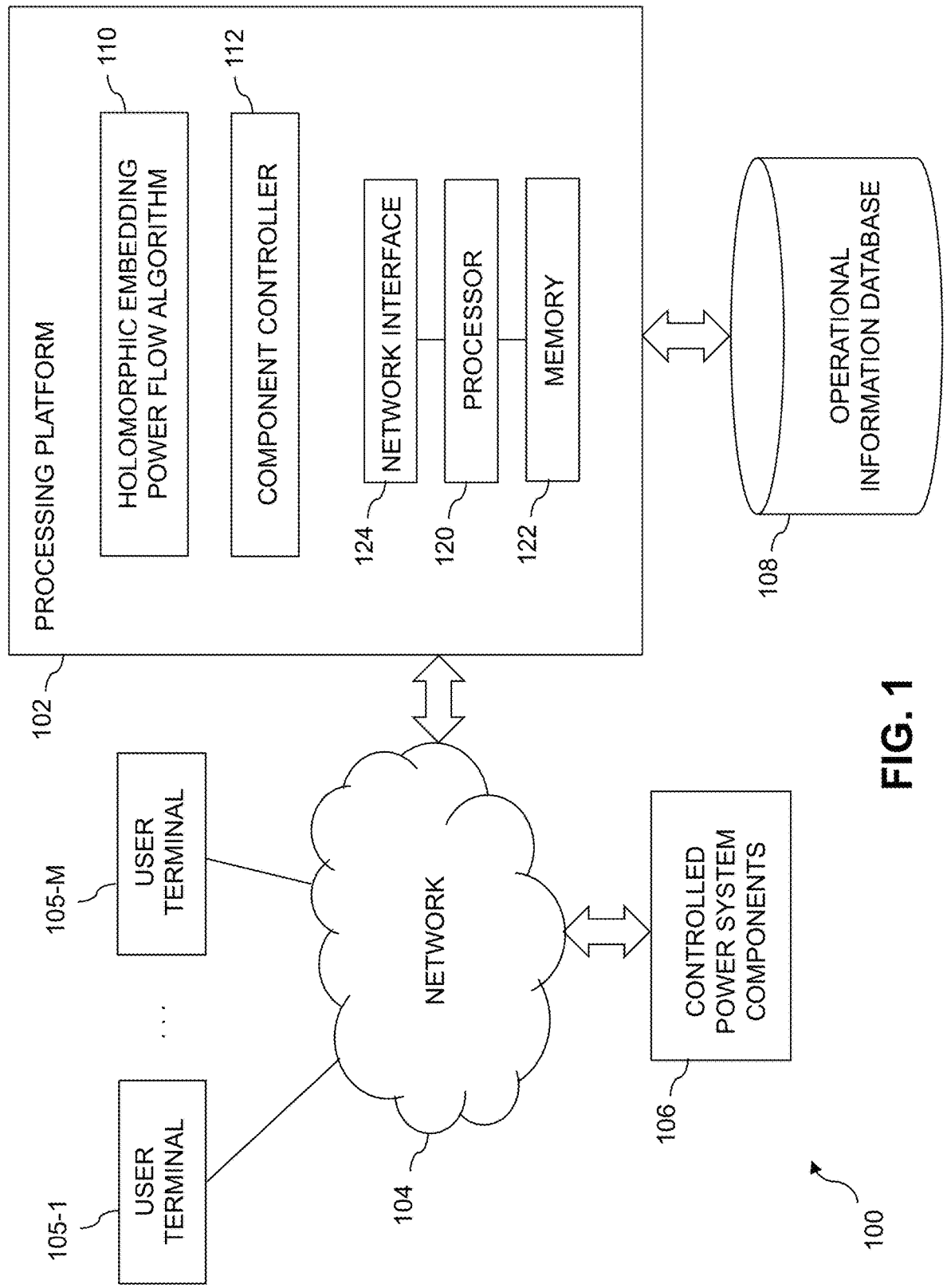
FIG. 1 is a block diagram of an information processing system that incorporates functionality for holomorphic embedding power flow for controlling power system components in an illustrative embodiment.

FIG. 1 shows an information processing system 100 implementing functionality for holomorphic embedding power flow for controlling power system components in an illustrative embodiment. The system 100 comprises a processing platform 102 coupled to a network 104. Also coupled to the network 104 are user terminals 105-1, . . . 105-M and controlled power system components 106. The processing platform 102 is configured to utilize an operational information database 108. Such a database illustratively stores operational information relating to operation of the controlled power system components 106. The controlled power system components 106 in some embodiments comprise electrical equipment of a power distribution system of an electric power utility or other type of electric power system. Numerous other types of electric power systems, or more generally physical systems, and their associated controlled components, can be used in other embodiments.

Figure 2:
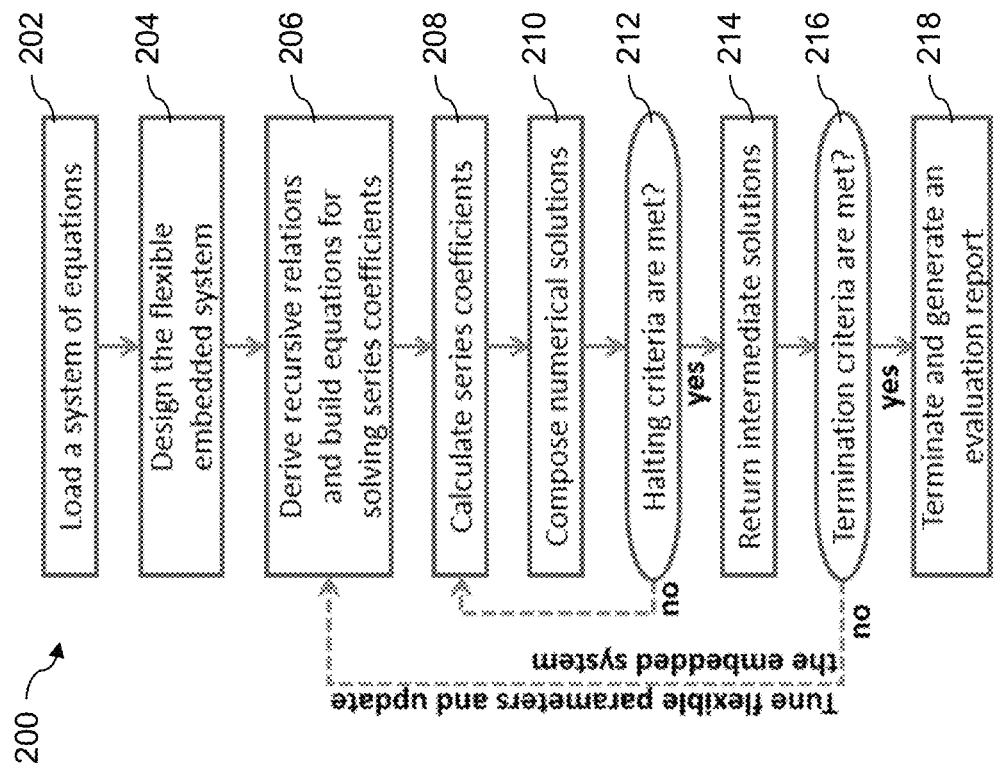
FIG. 2 is a flow diagram of a holomorphic embedding algorithm for solving nonlinear equations in one embodiment.
Figure 6:
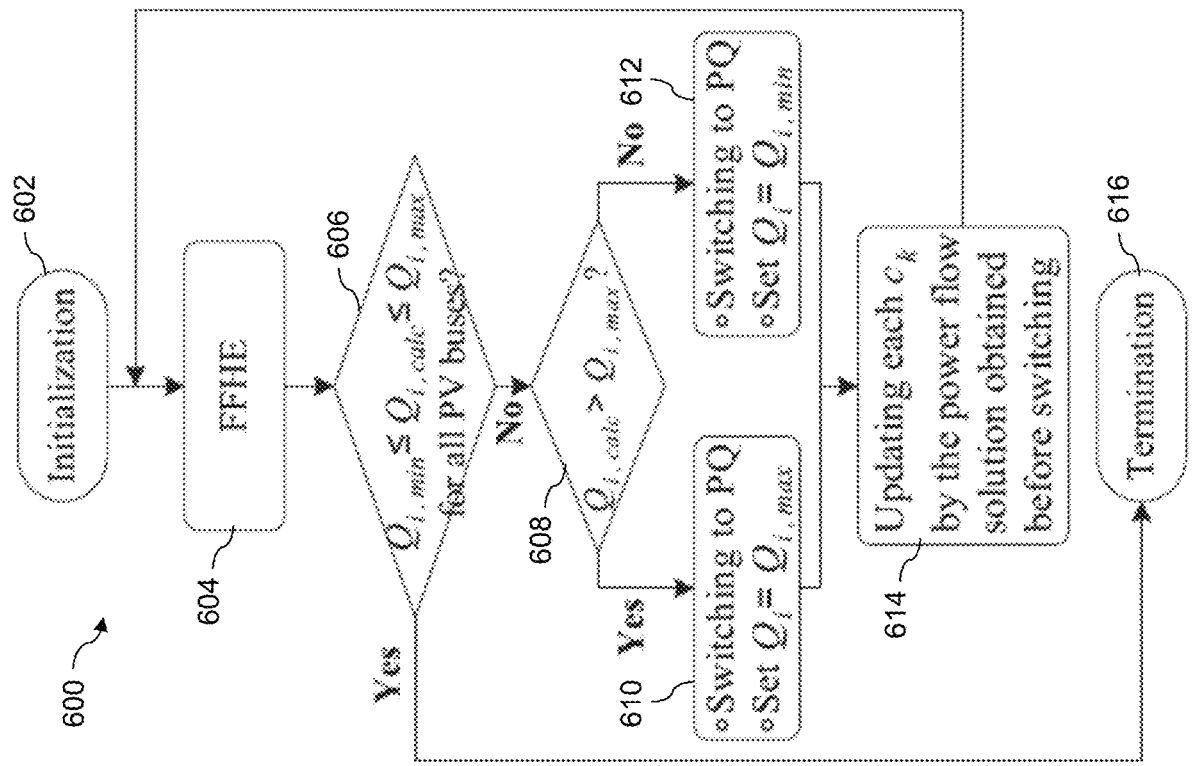
FIG. 6 is a flow diagram of a holomorphic embedding algorithm with a switching mechanism for dealing with reactive power limits in an illustrative embodiment.
Figure 17:
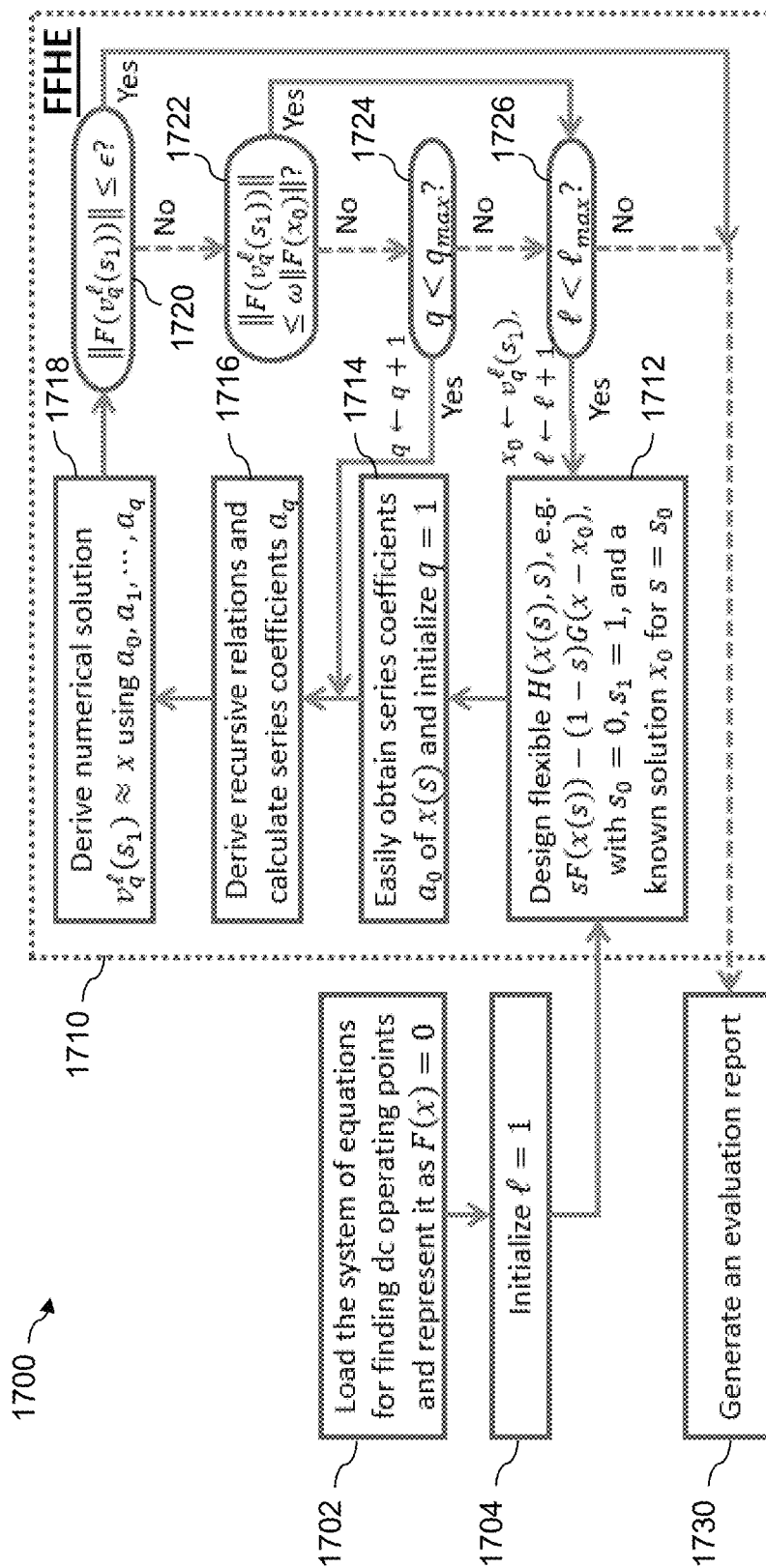
FIG. 17 is a flow diagram of a holomorphic embedding algorithm for determining DC operating points of an integrated circuit in an illustrative embodiment.

The processing platform 102 implements at least one holomorphic embedding power flow algorithm 110 and at least one component controller 112. Examples of holomorphic embedding power flow algorithms as well as other types of holomorphic embedding algorithms for use in applications outside of the power flow context are described elsewhere herein. For example, the flow diagrams of FIGS. 2 and 6 illustrate holomorphic embedding algorithms for use in the power flow context, and the flow diagram of FIG. 17 illustrates a holomorphic embedding algorithm for use outside of the power flow context, namely, in setting one or more DC operating points of an integrated circuit.

The component controller 112 generates one or more control signals for setting, adjusting or otherwise controlling various operating parameters associated with the controlled power system components 106 based at least in part on outputs generated by the holomorphic embedding power flow algorithm 110. For example, the component controller 112 can generate one or more control signals that are used to set, adjust or otherwise control operating parameters of respective controlled components of an electric power system. Such control of operating parameters of controlled components of an electric power system is one way in which the electric power system can be "configured in accordance with" the operating parameters, as that term is broadly used herein. A wide variety of different mechanisms may be initiated or otherwise triggered by the component controller 112 based at least in part on solutions generated by the holomorphic embedding power flow algorithm 110. Terms such as "control" and "control signal" as used herein are therefore also intended to be broadly construed.

The operational information database 108 is illustratively configured to store outputs generated by the holomorphic embedding power flow algorithm 110 and/or the component controller 112, in addition to the above-noted operational information relating to operation of the controlled power system components 106.

Although the holomorphic embedding power flow algorithm 110 and the component controller 112 are both shown as being implemented on processing platform 102 in the present embodiment, this is by way of illustrative example only. In other embodiments, the holomorphic embedding power flow algorithm 110 and the component controller 112 can each be implemented on a separate processing platform. A given such processing platform is assumed to include at least one processing device comprising a processor coupled to a memory. Examples of such processing devices include computers, servers or other processing devices arranged to communicate over a network. Storage devices such as storage arrays or cloud-based storage systems used for implementation of operational information database 108 are also considered "processing devices" as that term is broadly used herein.

It is also possible that at least portions of other system elements such as the controlled power system components 106 can be implemented as part of the processing platform 102, although shown as being separate from the processing platform 102 in the figure.

The processing platform 102 is configured for bidirectional communication with the user terminals 105 over the network 104. For example, images, displays and other outputs generated by the processing platform 102 can be transmitted over the network 104 to user terminals 105 such as, for example, a laptop computer, tablet computer or desktop personal computer, a mobile telephone, or another type of computer or communication device, as well as combinations of multiple such devices. The processing platform 102 can also receive input data from the controlled power system components 106 or other data sources, such as one or more external data sources, over the network 104.

The network 104 can comprise, for example, a global computer network such as the Internet, a wide area network (WAN), a local area network (LAN), a satellite network, a telephone or cable network, a cellular network, a wireless network implemented using a wireless protocol such as WiFi or WiMAX, or various portions or combinations of these and other types of communication networks.

Examples of automated actions that may be taken in the processing platform 102 responsive to outputs generated by the holomorphic embedding power flow algorithm 110 include generating in the component controller 112 at least one control signal for controlling at least one of the controlled power system components 106 over the network 104, generating at least a portion of at least one output display for presentation on at least one of the user terminals 105, generating an alert for delivery to at least one of the user terminals 105 over the network 104, and storing the outputs in the operational information database 108. Additional or alternative automated actions may be taken in other embodiments.

The processing platform 102 in the present embodiment further comprises a processor 120, a memory 122 and a network interface 124. The processor 120 is assumed to be operatively coupled to the memory 122 and to the network interface 124 as illustrated by the interconnections shown in the figure.

The processor 120 may comprise, for example, a microprocessor, an application-specific integrated circuit (ASIC), a field-programmable gate array (FPGA), a central processing unit (CPU), an arithmetic logic unit (ALU), a digital signal processor (DSP), or other similar processing device component, as well as other types and arrangements of processing circuitry, in any combination.

As a more particular example, in some embodiments, the processor 120 comprises one or more graphics processor integrated circuits. Such graphics processor integrated circuits are illustratively implemented in the form of one or more graphics processing units (GPUs). Accordingly, in some embodiments, system 100 is configured to include a GPU-based processing platform.

The memory 122 stores software program code for execution by the processor 120 in implementing portions of the functionality of the processing platform 102. For example, at least portions of the functionality of holomorphic embedding power flow algorithm 110 and component controller 112 can be implemented using program code stored in memory 122.

A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, flash memory, read-only memory (ROM), magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with one or both of the holomorphic embedding power flow algorithm 110 and the component controller 112 as well as other related functionality.

The network interface 124 is configured to allow the processing platform 102 to communicate over one or more networks with other system elements, and may comprise one or more conventional transceivers.

In operation, the holomorphic embedding power flow algorithm 110 obtains a system of nonlinear equations characterizing a physical system. More particularly, the physical system in the present embodiment illustratively comprises an electric power system characterized by a set of power flow equations. The holomorphic embedding power flow algorithm 110 constructs a flexible embedded system from the system of nonlinear equations, with the flexible embedded system being configurable with any of a plurality of arbitrary reference states as respective starting points, and utilizes the flexible embedded system to generate at least one output providing a solution to the system of nonlinear equations.

One or more operating parameters of the physical system are then established based at least in part on the output generated utilizing the flexible embedded system, and the physical system is configured in accordance with the one or more established operating parameters. Such operations are performed at least in part by the holomorphic embedding power flow algorithm 110 and/or the component controller 112. For example, the physical system is illustratively configured by generating one or more control signals in component controller 112 for application to the controlled power system components 106 via network 104, based at least in part on operating parameters established by the holomorphic embedding power flow algorithm 110. Other operating parameter establishment and physical system configuration arrangements can be used in other embodiments.

As a more particular example, in an embodiment such as that of FIG. 1 in which the physical system comprises an electric power system, the electric power system illustratively comprises a plurality of buses including at least one load bus, at least one generator bus and at least one reference bus. In such an embodiment, establishing one or more operating parameters of the physical system based at least in part on the output generated utilizing the flexible embedded system illustratively comprises establishing at least one of a voltage magnitude of the load bus and a reactive power of the generator bus. The load bus is also referred to as a PQ bus, where P denotes real power and Q denotes reactive power, and the generator bus is also referred to as a PV bus, where P again denotes real power and V denotes voltage magnitude. The reference bus is also referred to as a slack bus or a swing bus. The electric power system can include numerous instances of each of these buses.

As indicated previously, the disclosed holomorphic embedding techniques are not limited to use with electric power systems, but are more generally applicable to a wide variety of other types of physical systems. For example, in other embodiments the physical system comprises an integrated circuit, and establishing at least one operating parameter of the physical system based at least in part on the output generated utilizing the flexible embedded system comprises establishing at least one DC operating point of the integrated circuit. A wide variety of other types of physical systems can be configured utilizing the disclosed holomorphic embedding techniques in other embodiments.

In some embodiments, the system of nonlinear equations is of the form $F(x)=0$ where x is a vector of unknowns, and the flexible embedded system is of the form $H(x, s)=0$ where s extends the vector of unknowns x to a parameterized vector function of unknowns $x(s)$, and where $H(x, s_1)=F(x)$ for $s=s_1 \in \mathbb{C}$, where $s_1$ denotes a target state of the flexible embedded system, and $\mathbb{C}$ is the set of complex numbers. It is assumed that an initial solution $x(s_0)=x_0$ to $H(x, s_0)=0$ is known or easily solvable for $s=s_0 \in \mathbb{C} \setminus \{s_1\}$, where $s_0$ denotes a particular one of the arbitrary reference states of the flexible embedded system.

The flexible embedded system in such embodiments is illustratively constructed from the system of nonlinear equations $F(x)=0$ based at least in part on the initial solution utilizing the equation:

$$H(x,s)=s \cdot F(x)+(1-s) \cdot (x-x_0).$$

Other equations can be used to construct the flexible embedded system from the system of nonlinear equations $F(x)=0$ based at least in part on the initial solution, such as the following equation:

$$H(x,s)=s \cdot F(x)+(1-s) \cdot (F(x)-F(x_0)).$$

The foregoing equations for constructing the flexible embedded system are only examples, and can be varied in other embodiments.

The parameterized vector function of unknowns $x(s)$ is illustratively represented as a series expansion in s about $s_0$ by deriving recursive relations between coefficients of the series expansion for $x(s)$, constructing a system of linear equations for solving the coefficients, and solving the system of linear equations to obtain the coefficients.

In some embodiments, utilizing the flexible embedded system to generate at least one output providing a solution to the system of nonlinear equations comprises directly deriving a numerical solution based at least in part on a ratio of matrix determinants obtained using coefficients of a series expansion of a parameterized vector function of unknowns about a particular one of the starting points.

Additionally or alternatively, utilizing the flexible embedded system to generate at least one output providing a solution to the system of nonlinear equations comprises performing a plurality of iterations using the flexible embedded system configured with respective different starting points, with a first one of the iterations utilizing a first one of the arbitrary reference states as an initial starting point for the flexible embedded system, and subsequent ones of the iterations utilizing intermediate solutions from respective previous ones of the iterations as respective other ones of the starting points for the flexible embedded system.

For example, utilizing the flexible embedded system to generate at least one output providing a solution to the system of nonlinear equations illustratively comprises obtaining a prospective solution, determining if the prospective solution satisfies one or more specified termination criteria, responsive to the prospective solution satisfying the one or more specified termination criteria, designating the prospective solution as a final solution and generating the output providing that solution, and responsive to the prospective solution not satisfying the one or more specified termination criteria, designating the prospective solution as an intermediate solution, modifying the flexible embedded system using the intermediate solution as another one of the starting points, and utilizing the modified flexible embedded system to obtain another prospective solution.

The initial starting point for the flexible embedded system can be determined by applying a different type of nonlinear equation solver to the system of nonlinear equations to generate the initial starting point. For example, the different type of nonlinear equation solver can comprise a Gauss-Seidel solver, a fast-decoupled Newton solver or another type of solver, as will be described in more detail elsewhere herein.

As indicated previously, in the embodiment of FIG. 1 the system of nonlinear equations comprises a set of power flow equations of an electric power system, and the electric power system illustratively comprises a plurality of buses including one or more generator buses, one or more load buses and one or more reference buses. The set of power flow equations in such an embodiment may be subject to Q-limits, where Q denotes reactive power.

For embodiments that are subject to such Q-limits, utilizing the flexible embedded system to generate at least one output providing a solution to the system of nonlinear equations illustratively comprises initializing the generator buses as PV buses, and generating a prospective solution to the set of power flow equations utilizing the flexible embedded system with an initial starting point.

Responsive to all of the PV buses satisfying the Q-limits in the prospective solution, the prospective solution is designated as a final solution and the output is generated providing that solution.

However, responsive to any of the PV buses not satisfying the Q-limits in the prospective solution, those PV buses are switched to PQ buses, the prospective solution is designated as an intermediate solution, and the flexible embedded system is modified using the intermediate solution as another one of the starting points. The modified flexible embedded system is then utilized to obtain another prospective solution to the set of power flow equations.

The above-described switching process can continue for one or more additional iterations until a satisfactory solution is achieved. Additional details of a switching process of this type will be described below in conjunction with the flow diagram of FIG. 6.

It is to be appreciated that the particular arrangements of components and other system elements shown in FIG. 1 is presented by way of illustrative example only, and numerous alternative embodiments are possible. For example, other embodiments of information processing systems can be configured to provide holomorphic embedding functionality of the type disclosed herein.

FIG. 2 shows an example of a set of processing operations performed by the holomorphic embedding power flow algorithm 110 in an illustrative embodiment. The algorithm in this embodiment comprises a process 200 having steps 202 through 218 which are illustratively executed by the processing platform 102, utilizing processor 120, memory 122 and network interface 124, and possibly similar components of one or more additional processing devices of the processing platform 102.

In step 202, a system of equations is loaded into the processing platform 102, illustratively from the operational information database 108. Other sources of such systems of equations or portions thereof can include one or more of user terminals 105 or other sources accessible to the processing platform 102 via the network 104. The system of equations illustratively comprises power flow equations of an electric power system, although other systems of equations characterizing other types of physical systems can be used.

In step 204, a flexible embedded system is designed utilizing the system of equations previously loaded in step 202. The flexible embedded system in some embodiments is generated using equations of the type presented above.

In step 206, recursive relations are derived between coefficients of the series expansion of the parameterized vector function of unknowns $x(s)$ about the starting point $s_0$ and a system of linear equations is built for solving the coefficients.

In step 208, the system of linear equations built in step 206 is used to calculate the series coefficients.

In step 210, one or more numerical solutions are composed. For example, a given such solution to the system of nonlinear equations is illustratively generated by directly deriving a numerical solution based at least in part on a ratio of matrix determinants obtained using the coefficients of the series expansion of unknowns $x(s)$ about the starting point $s_0$.

In step 212, a determination is made as to whether or not one or more designated halting criteria are met. If the one or more halting criteria are met, the process moves to step 214, and otherwise returns to step 208 to recalculate the series coefficients as indicated. Examples of suitable halting criteria are described elsewhere herein.

In step 214, the one or more numerical solutions previously generated in step 208 are returned as respective intermediate solutions. The designation of such solutions as intermediate solutions in this embodiment may be only a temporary designation, as a given such solution can become a final solution if designated termination criteria are met. The intermediate solutions at this stage of the process are also referred to herein as "prospective solutions" to the system of equations previously loaded in step 202.

In step 216, a determination is made as to whether or not the designated termination criteria are met. If the one or more termination criteria are met, the process moves to step 218, and otherwise returns to step 206 to tune the flexible parameters and update the embedded system as indicated. For example, tuning the flexible parameters and updating the embedded system illustratively comprise modifying the embedded system to utilize one of the intermediate solutions as a starting point for a subsequent iteration of steps 206 through 216. Examples of suitable termination criteria are described elsewhere herein.

In step 218, which is reached when at least one of the intermediate solutions satisfies the termination criteria and thereby becomes a final solution, the process is terminated and an evaluation report is generated as indicated. Additional or alternative automated actions can be performed, such as establishing one or more operating parameters of the corresponding physical system based at least in part on the final solution, and configuring the physical system in accordance with the established operating parameters. A given "evaluation report" as that term is broadly used herein can therefore comprise a listing or other information specifying established parameters for the physical system.

The particular processing operations and other system functionality described in conjunction with the flow diagram of FIG. 2 and other flow diagrams herein are presented by way of illustrative example only, and should not be construed as limiting the scope of the disclosure in any way. Alternative embodiments can use other types of processing operations for implementing holomorphic embedding functionality. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different holomorphic embedding processes for respective different physical systems.

Functionality such as that described in conjunction with the flow diagram of FIG. 2 and other flow diagrams herein can be implemented at least in part in the form of one or more software programs stored in memory 122 and executed by processor 120 within the processing platform 102. A memory or other storage device having executable program code of one or more software programs embodied therein is an example of what is more generally referred to herein as a "processor-readable storage medium." Articles of manufacture or other computer program products each comprising one or more such processor-readable storage media are considered illustrative embodiments of the present disclosure.

An example of a holomorphic embedding algorithm with a switching mechanism for dealing with reactive power limits will be described below in conjunction with the flow diagram of FIG. 6.

A further example of a holomorphic embedding algorithm that is applied in an embodiment relating to establishing DC operating points of an integrated circuit is shown in the flow diagram of FIG. 17.

Numerous additional examples of holomorphic embedding algorithms are described in detail elsewhere herein.

Figure 4:
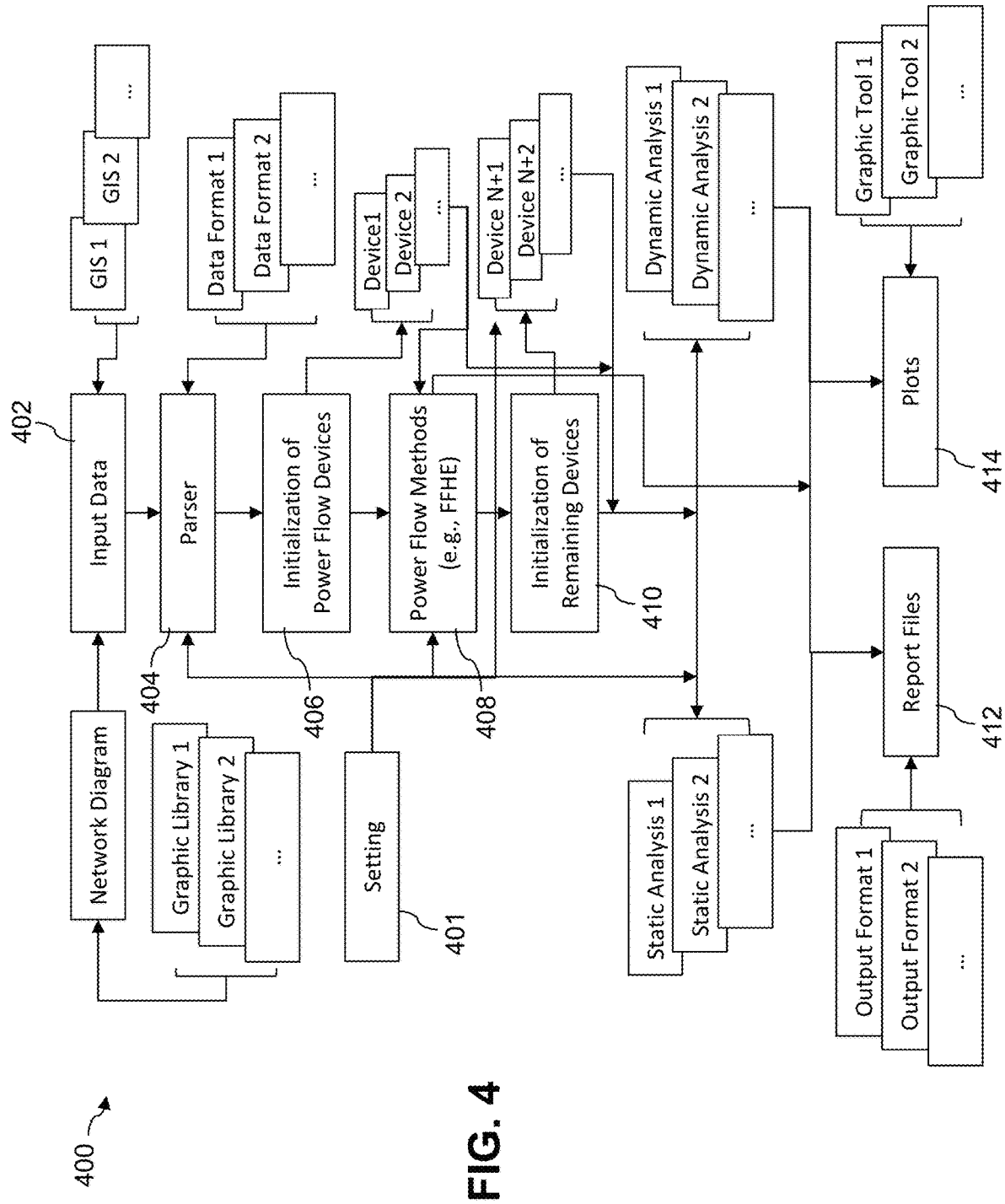
Figure 5:
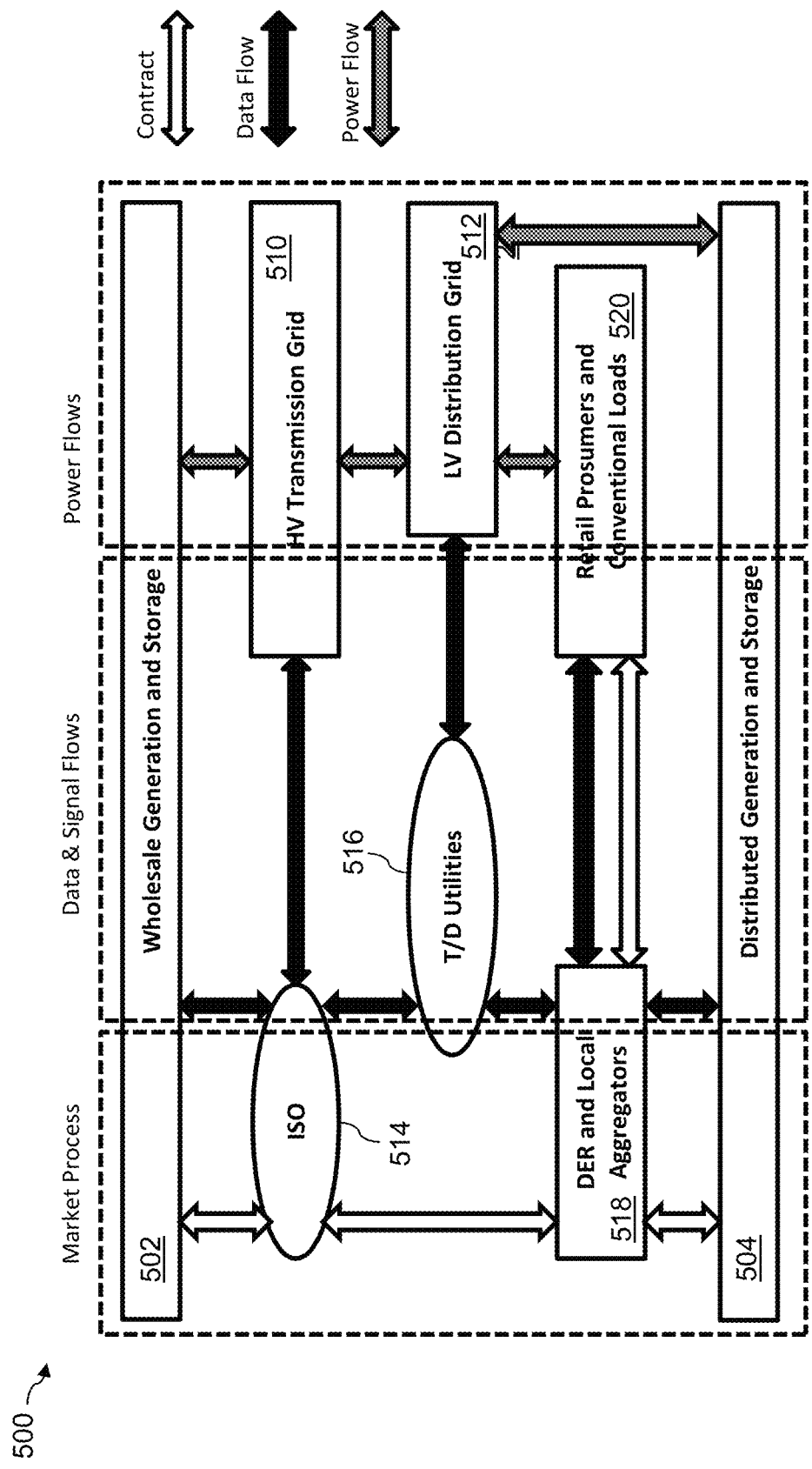

As noted above, the controlled power system components 106 in some embodiments comprise electrical equipment of a power distribution system of an electric power utility. Examples of these and other electric power systems in which various components can be controlled utilizing outputs generated by the holomorphic embedding power flow process of FIG. 2 are shown in FIGS. 3, 4 and 5.

Figure 3:
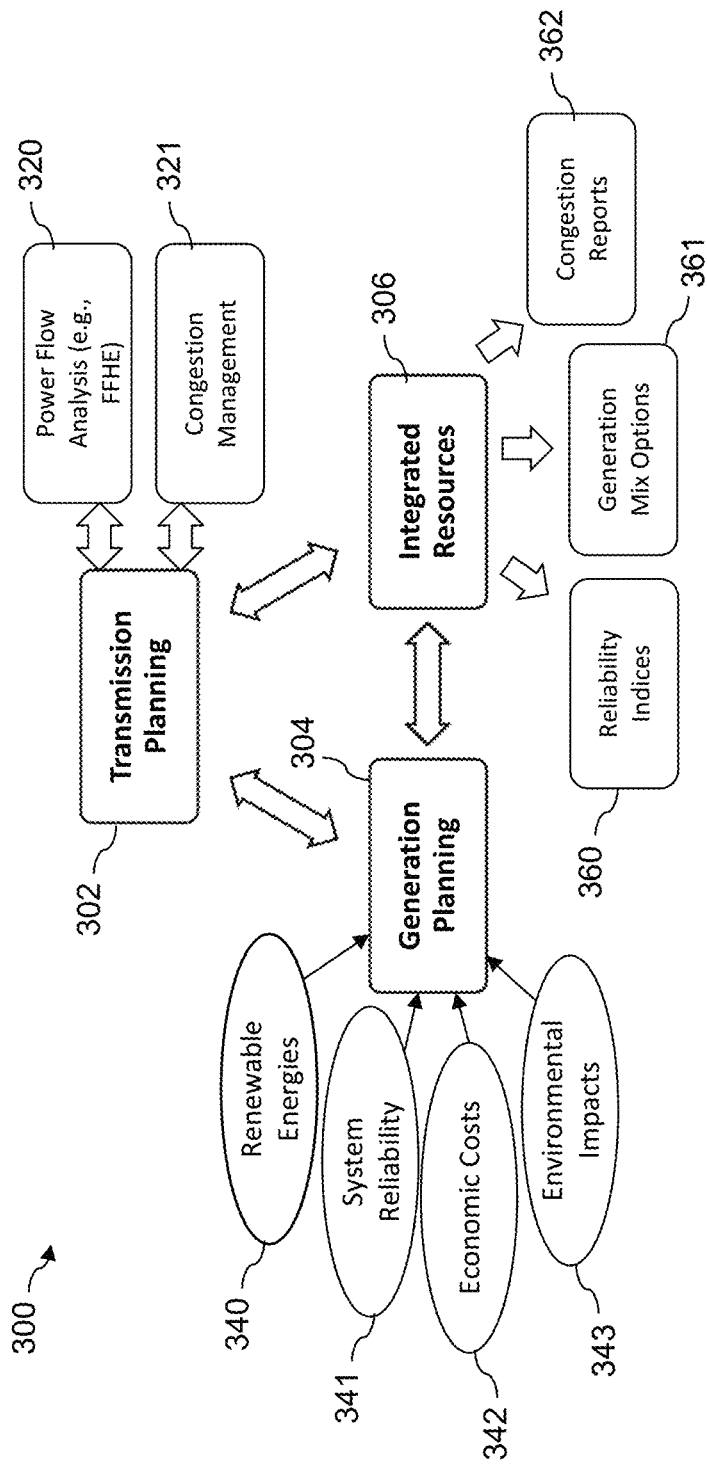
FIGS. 3, 4 and 5 are examples of power systems in which components can be controlled utilizing the holomorphic embedding algorithm of FIG. 2.

FIG. 3 shows an example electric power system 300 in which the holomorphic embedding power flow process interacts with electric power system components in conjunction with power system planning and operation relating to electric power generation and transmission. This electric power system 300 utilizes an illustrative embodiment of the holomorphic embedding power flow process more particularly referred to herein as fast flexible holomorphic embedding (FFHE) in performing power flow analysis that is utilized to control electrical equipment or other power system components relating to electric power generation and transmission.

More particularly, the electric power system 300 implements functionality for electric power transmission planning 302, electric power generation planning 304, and electric power integrated resources 306.

In this embodiment, the FFHE algorithm is utilized to perform power flow analysis 320. The results of the power flow analysis 320 are applied in conjunction with congestion management 321 to transmission planning 302 to establish various operating parameters of the electric power system 300. This involves interaction between transmission planning 302, generation planning 304 and integrated resources 306.

Accordingly, results generated by the FFHE algorithm as part of the power flow analysis 320 can be used to establish a wide variety of different operating parameters for numerous distinct components of the electric power system 300.

For example, the generation planning 304 takes into account renewable energies 340, system reliability 341, economic costs 342 and environmental impacts 343. Such information can be combined with results generated by the FFHE algorithm in establishing various operating parameters.

The integrated resources 306 in this embodiment utilize results generated by the FFHE algorithm in providing reliability indices 360, generation mix options 361 and congestion reports 362.

In the FIG. 4 embodiment, a power system 400 applies FFHE as a power flow method in performing initialization of power flow devices of the power system as well as in controlling other aspects of power system functionality. Such initialization is considered a type of "component control" as that term is broadly used herein. In this embodiment, various operations to be performed in the power system 400 are configured in accordance with a setting operation 401 prior to or otherwise in conjunction with processing of input data 402 using a parser 404. The input data 402 in this embodiment includes by way of example and without limitation one or more power system network diagrams retrieved from graphic libraries denoted Graphic Library 1, Graphic Library 2, etc. The input data 402 further comprises data received from one or more Geographic Information Systems (GISs) denoted GIS 1, GIS 2, etc.

The parser 404 processes the input data 402 into portions arranged in particular data formats, such as Data Format 1, Data Format 2, etc. After processing of the input data 402 in the parser 404 to identify particular portions of the input data 402 associated with particular power flow devices of the power system 400, a designated subset of the power flow devices are initialized in an initialization operation 406. These initialized power flow devices illustratively include power flow devices denoted Device 1, Device 2, etc.

One or more power flow methods of the type disclosed herein are then applied as indicated in operation 408. The applied power flow methods illustratively include at least one instance of an FFHE algorithm as described elsewhere herein. The parameters of the initialized power flow devices such as Device 1, Device 2, etc. provide further inputs to the one or more power flow methods. The resulting outputs of the one or more power flow methods are used in a further initialization operation 410 to initialize remaining devices of the power system 400, including devices denoted Device N+1, Device N+2, etc. As indicated previously, these and other devices are considered examples of "controlled components" of the power system 400, and are illustratively configured utilizing outputs generated by a holomorphic embedding power flow algorithm such as FFHE.

Various types of static analysis and/or dynamic analysis are performed in the power system 400 using the outputs generated by the one or more power flow methods applied in operation 408, including static analysis denoted Static Analysis 1, Static Analysis 2, etc. and dynamic analysis denoted Dynamic Analysis 1, Dynamic Analysis 2, etc.

The outputs of the one or more power flow methods applied in operation 408 are also utilized to generate report files 412 in accordance with output formats denoted Output Format 1, Output Format 2, etc. Additionally or alternatively, the outputs of the one or more power flow methods applied in operation 408 are utilized to generate plots 414 utilizing graphic tools denoted Graphic Tool 1, Graphic Tool 2, etc. The static and/or dynamic analysis referred to above can also be characterized in the report files 412 and plots 414.

FIG. 5 shows another example power system 500 in which one or more power system components are controlled utilizing signals or other outputs generated by a holomorphic embedding power flow process. The controlled components of the power system 500 in this embodiment illustratively include various types of electrical equipment associated with one or more of wholesale generation and storage 502, distributed generation and storage 504, a high voltage (HV) transmission grid 510, a low voltage (LV) distribution grid 512, an independent system operator (ISO) 514, transmission and/or distribution (T/D) utilities 516, distributed energy resource (DER) and local aggregators 518, and retail prosumers and conventional loads 520. Signaling between these entities of the power system 500 illustratively includes one or more of contract related signaling, data flow related signaling and power flow related signaling, relating generally to market process aspects, data and signal flows, and power flows, as illustrated by the dashed boxes.

Such signaling illustratively comprises one or more control signals of the type described elsewhere herein for controlling one or more power system components of at least one of the above-noted entities within the power system 500. The control signals may be communicated between entities of the power system 500 over one or more networks, which are not explicitly shown in the figure.

The particular power systems shown in FIGS. 3, 4 and 5 are presented by way of illustrative example only, and should not be viewed as limiting in any way. Accordingly, the particular components thereof and their respective configurations in the corresponding figures can be varied in other embodiments.

Additional details of illustrative embodiments will now be described. These include example implementations of FFHE algorithms.

In practical operation of electric power grids, power flow study is widely performed. Power flow study, also referred to as load flow study, in some embodiments involves the determination of steady-state conditions of a power system for a specified power generation and load demand. A power flow problem in such embodiments illustratively involves the computation of voltage magnitude and phase angle at each bus in a power system. Power flow study is performed extensively both for system planning purposes to analyze alternative plans of future systems and for system operation purposes to evaluate different operating conditions of existing systems. Indeed, power flow study is used in both operation and planning to check for branch overloads and voltage violation problems.

In a static contingency analysis (CA) function, which is a basic function of an energy management system (EMS) that typically resides at the energy control center of a power company, power flow study is used to assess the effect of branch and/or generator outages on the network in terms of branch overloads and voltage violation.

In available transfer capability (ATC) calculations, repetitive power flow study is performed to calculate power transfer limits.

In an on-line security enhancement function implemented at the EMS, power flow study is used to assess the effectiveness of a proposed corrective or enhancement control.

These and other techniques generally involve utilizing results of the power flow study to establish one or more operating parameters of an electric power system and configuring the electric power system in accordance with the one or more established operating parameters. Additional or alternative techniques can be used in other embodiments.

Conventional numerical techniques that have been routinely used in the power industry world-wide to solve power flow equations include the Newton method and the fast-decoupled Newton method. Illustrative embodiments herein provide a powerful methodology which, when applied to power flow study, can provide superior performance relative to these and other conventional approaches in terms of speed, robustness and versatility.

As indicated previously, illustrative embodiments herein are not limited to power flow study or other aspects of configuring electrical power systems. For example, another important application of holomorphic embedding techniques as disclosed herein is in simulating or otherwise characterizing the behavior of an electrical or electronic circuit (e.g., a very large-scale integrated circuit) in order to find the quiescent or DC operating point of the circuit. This is important because the operating point is required when performing other types of circuit analysis. For example, the DC operating point is used as the starting point for transient analysis used to determine circuit response in the time domain. Circuit design algorithms also need the DC operating point of the circuit. In this case, the operating point is required to evaluate the DC performance of the current design under a given set of constraints on the circuit's components. Traditionally, the operating point is found by using the Newton-Raphson method (NR). This method has three potential problems, including slow speed, divergence and diagnosis capability. Again, illustrative embodiments herein provide a powerful methodology which, when applied to determination of DC operating points, can provide superior performance than the existing ones in terms of speed, robustness and versatility.

Both power flow study and DC operating point calculation generally involve solving a system of nonlinear equations of the form $$F(x)=0, \quad (1)$$

where $x=(x_1, \ldots, x_n) \in \mathbb{C}^n$ is the vector of unknowns and $F=(F_1, \ldots, F_n)^T: \mathbb{C}^n \mapsto \mathbb{C}^n$ is a multivariate vector-valued map. Usually, each $F_i$ is a composition of common functions, such as polynomial functions, logarithmic functions, and trigonometric functions. Several practical applications in electric grids require solving (1). For instance, the AC power balance equations in the electric power system analysis, nodal equations for DC operating points in integrated circuits, and algebraic Riccati equations for the optimal control problem in continuous or discrete time are all nonlinear equations and can be represented as form (1). The task is to find a point $x^* \in \mathbb{C}^n$ at which the system of equations (1) is satisfied, i.e., $F(x^*)=0$.

Different numerical methods have been developed to solve problem (1), such as the Newton-Raphson method, the Gauss-Seidel method, homotopy-based methods (e.g., numerical continuation), and dynamic-trajectory-based methods. These methods are usually iterative, and local methods, which can require an evaluation of derivatives, are time consuming. Moreover, traditional holomorphic embedding methods were developed to solve the power flow equations (which are typically polynomial equations) but can only accept several particular points and states as initial guesses and consume a great deal of computing time and memory in practice with an extent of application that is very limited.

To overcome the above shortcomings of existing iterative methods and traditional holomorphic embedding methods, illustrative embodiments provide what is referred to herein as FFHE methods, which are non-iterative and generally do not require an evaluation of a Jacobian matrix. In some embodiments, FFHE methods are robust to derive an approximation to the solution $x^*$ by rational approximants and their variants. In addition, FFHE enjoys flexibility in the choice of initial points and provides improved numerical performance in convergence and runtime with a broad scope of applications. The manner in which an example FFHE method is used to solve nonlinear equations will now be described in further detail.

To solve problem (1) by FFHE, we proceed as follows.

When solving a system of nonlinear equations $F(x)=0$ as (1), we introduce a parameter s such that the vector of unknowns x is extended to a vector function of unknowns $x(s)$, and an embedded system is a parametrized system of the form $H(x, s)=0$ such that $H(x, s_1)=F(x)$ for some $s=s_1 \in \mathbb{C}$, where $s_1$ is called the target state. A solution $x(s_0)=x_0$ to $H(x, s_0)=0$ can be easily solved, known, or freely specified by users at some $s=s_0 \in \mathbb{C} \setminus \{s_1\}$, where $s_0$ is called the reference state or initial state.

In general, one can design a flexible embedded system as $H(x, s)=s \cdot F(x)+(1-s) \cdot (x-x_0)$ or $H(x, s)=s \cdot F(x)+(1-s) \cdot (F(x)-F(x_0))$, which meets the above requirements and the value of $x_0$ can be freely adjusted. Other methodologies are also available to design the embedded systems depending on the applications, problems under study, and domain knowledge.

In general, one can represent the parametrized function $x(s)$ as a power series expansion in s near $s_0$. To this end, one can parse the terms and functions in $H(x(s), s)$, derive the recursive relation between the coefficients of the series expansion for $x(s)$, and derive a system linear equation for solving the series coefficients.

Next, to derive a numerical solution, we usually compose a numerical solution by a ratio of matrix determinants or the rational approximant using the power series coefficients obtained for $x(s)$.

If certain (halting or termination) criteria are satisfied, such as the maximum mismatch or the inter-step difference decreasing to a threshold value, then we can tune the flexible parameters and update the embedded system or terminate the computation.

On the implementation side, the following approach is applied in illustrative embodiments to compute a numerical solution for (1) by FFHE. This approach may be viewed as a more particular example of the holomorphic embedding algorithm previously described in conjunction with the flow diagram of FIG. 2.

Stage 1: We construct an embedded system $H(x, s)$, such as $H(x, s)=s \cdot F(x)+(1-s) \cdot (x-x_0)$, $H(x, s)=s \cdot F(x)+(1-s) \cdot (F(x)-F(x_0))$, or use another methodology based on the applications, problems under study, and domain knowledge. Here, the reference state and target state are $s=s_0$ and $s=s_1$, respectively, for which $x=x_0$ is a solution to $H(x, s_0)=0$.

Stage 2: The vector function of unknowns is expressed as a series expansion, for example, as follows:

$$x(s) = \Sigma_{q \geq 0} a_q (s-s_0)^q = a_0 + a_1(s-s_0) + a_2(s-s_0)^2 + \ldots$$

Here, $x_k(s)$ is the k-th element in $x(s)$ and has a series expansion as $x_k(s)=\Sigma_{q \geq 0} a_{k,q}(s-s_0)^q$. The vector $a_q=(a_{1,q}, a_{2,q}, \ldots, a_{n,q})^T \in \mathbb{C}^n$ consists of the coefficient of $(s-s_0)^q$ in the series expansion of $x_k(s)$ for all $1 \leq k \leq n$.

Stage 3: First, one has $a_0=x_0$. To find the values of coefficients $a_l$, $l \geq 1$, we insert the series expansion $x(s)=\Sigma_{q \geq 0} a_q (s-s_0)^q$ into the embedded system, i.e., $H(\Sigma_{q \geq 0} a_q (s-s_0)^q, s)=0$. Then, one can equate the coefficients for terms $(s-s_0)^q$ and obtain the linear equation $A_l a_l = B_l$ for solving $a_l$, $l \geq 1$. Here, the entries of $A_l \in \mathbb{C}^{n \times n}$ and $B_l \in \mathbb{C}^n$ only depend on the values of $a_q$ for $0 \leq q \leq l-1$.

Stage 4: Suppose that the values of $a_0, a_1, \ldots, a_q$ have been obtained for some $q \geq 0$. If the values of $x(s)$ are needed only for a few $s=s_1$, one can compute a numerical solution $v_{k,q}$ that approximates the kth element $x_k$ of $x=(x_1, x_2, \ldots, x_k, \ldots)$ as follows:

$$v_{k,q} = \det(\Psi(\mathbb{L}_k^{\zeta,\eta}(\Delta s)))/\det(\Psi(\mathbb{M}_k^{\zeta,\eta}(\Delta s))). \tag{2}$$

Here, $\det(\cdot)$ is the matrix determinant, and the integers $\zeta = \lfloor q/2 \rfloor$ and $\eta = q - \zeta$ such that $\zeta + \eta = q$, where $\lfloor \aleph \rfloor$ is the largest integer $\leq \aleph$. In addition, $\Delta s \doteq (s_1 - s_0)$ is known and fixed. The map $\Psi$ is linear (having full rank), and the square matrices are $$\mathbb{M}_k^{\zeta,\eta}(z) \doteq \begin{pmatrix} a_{k,\zeta-\eta+1} & a_{k,\zeta-\eta+2} & \cdots & a_{k,\zeta+1} \\ \vdots & \vdots & \ddots & \vdots \\ a_{k,\zeta} & a_{k,\zeta+1} & \cdots & a_{k,\zeta+\eta} \\ z^\eta & z^{\eta-1} & \cdots & 1 \end{pmatrix}.$$

On the other hand, if $x(s)$ needs to be evaluated for many s or an explicit approximate function for $x(s)$ is useful, one can compute an approximant instead, e.g., the Pade approximant, as $$[L/M]_k(s) = \frac{\alpha_{k0} + \alpha_{k1}(s-s_0) + \ldots + \alpha_{kL}(s-s_0)^L}{\beta_{k0} + \beta_{k1}(s-s_0) + \ldots + \beta_{kM}(s-s_0)^M}, \tag{3}$$

which is the rational function such that $\Sigma_{q=0}^{\infty} a_{k,q}(s-s_0)^q - [L/M]_k(s) = O((s-s_0)^{L+M+1})$, and $a_{k,q}$ is the coefficient of $(s-s_0)^q$ in the series expansion of $x_k(s)$. Here, the approximant $[L/M]_k(s)$ provides an approximation for function $x_k(s)$.

Stage 5: Evaluate the halting criteria, such as the max mismatch having decreased by a certain percentage or below a pre-specified threshold value. If the criterion is not satisfied, repeat stages 3 and 4 and compute new numerical solutions by solving higher-order coefficients (i.e., $a_{q+1}, a_{q+2}, \ldots$) in the series expansion. Otherwise, go to stage 6.

Stage 6: Evaluate the termination criterion, such as the max mismatch having decreased below a pre-specified threshold value or numerical solutions having been completely obtained for the concerned domain. If the criterion is not satisfied, then the embedded system may need to be updated by tuning the adjustable parameters. Otherwise, terminate the computation and generate an evaluation report for summarizing the solving procedure and results.

The above-described FFHE embodiment can be applied to solve nonlinear equations (e.g., power flow equations and nodal equations for solving DC operating points), and in numerous other contexts.

It is to be appreciated that various aspects of the FFHE approach in the example implementations described above can be varied in other embodiments.

Additional aspects of illustrative embodiments relating to use of FFHE in engineering applications will now be described.

For example, in the field of electric power engineering, FFHE can be used to solve electric power flow problems as will now be described.

In electric power engineering, the power flow problems at the PQ and PV buses can be represented as:

$$\Sigma_{k=1}^{N} Y_{ik} V_k S_i^*/V_i^* = 0, \quad (4a)$$

$$\Sigma_{k=1}^{N} Y_{ik}^* V_k^* - S_i/V_i = 0, \quad (4b)$$

$$|V_i| - V_{i,sp} = 0, \quad (4c)$$

$$P_i - Re(V_i \Sigma_{k=1}^{N} Y_{ik}^* V_k^*) = 0, \quad (4d)$$

where (4a) and (4b) are the power flow equations if bus i is a PQ bus, while (4c) and (4d) are the equations if bus i is a PV bus. Here, $S_i$ is the power injection at bus i, and $V_k$ is the voltage at bus k. The admittance matrix $Y = (Y_{ik})_{N \times N}$, bus 1 is the slack bus, and $S_i^* = \mu_i - j\nu_i \in \mathbb{C}$ is the conjugate of the complex number $S_i = \mu_i + j\nu_i$, where $\mathbb{R}$ is the set of real numbers and $\mathbb{C}$ is the set of complex numbers, with $\mu_i, \nu_i \in \mathbb{R}$. In (4c) and (4d), $P_i$ is the real power injection, and $V_{i,sp}$ is the specified voltage magnitude at bus i. Here, $|z|$ and $Re(z)$ are the magnitude and the real part of $z \in \mathbb{C}$, respectively. In other words, the unknown x in form (1) is the vector of $V_k$'s and $V_i^*$'s, while F(x) consists of the expressions on the left-hand sides of (4), where (4) collectively denotes (4a), (4b), (4c) and (4d). The procedure for solving (4) for $V_k$'s by FFHE is described below.

For the first stage, a flexible embedded system is constructed for (4), which allows any point (not just some particular points) as the solution for the reference state $s_0 = 0$, say $$V_i^*(s^*) \Sigma_k Y_{ik} V_k(s) - (1-s) \cdot c_i^* \Sigma_k Y_{ik} c_k - s \cdot S_i^* = 0, \quad (5a)$$

$$V_i(s) \Sigma_k Y_{ik}^* V_k^*(s^*) - (1-s) \cdot c_i \Sigma_k Y_{ik}^* c_k^* - s \cdot S_i = 0, \quad (5b)$$

$$V_i(s) V_i^*(s^*) - (1-s) \cdot c_i c_i^* - s \cdot |V_{i,sp}|^2 = 0, \quad (5c)$$

$$V_i^*(s^*) \Sigma_k Y_{ik} V_k(s) + V_i(s) \Sigma_k Y_{ik}^* V_k^*(s^*) - (1-s) \cdot \{c_i^* \Sigma_k Y_{ik} c_k + c_i \Sigma_k Y_{ik}^* c_k^*\} - s \cdot 2P_i = 0. \quad (5d)$$

Here, (5a), (5b), (5c), and (5d) are embedded systems for (4a), (4b), (4c), and (4d), respectively, with the reference state $s_0 = 0$ and the target state $s_1 = 1$. The constant $c_k \in \mathbb{C} \setminus \{0\}$ is adjustable and can accept any value specified by the users. Here, $V_k(0) = c_k$ is a solution for (5) at $s_0 = 0$, and $V_1(s) \equiv c_1$ for all $s \in \mathbb{C}$, where (5) collectively denotes (5a), (5b), (5c) and (5d).

For the second stage, given the embedded system (5), the following procedure can solve the coefficients $a_{k,q}$ in the series expansion $V_k(s) = \Sigma_{q=0}^{\infty} a_{k,q} s^q$ and $V_k^*(s^*) = \Sigma_{q=0}^{\infty} a_{k,q}^* s^q$ for (5). We take (5a) as an example to show the procedure. Suppose the solution function $V_k(s) \neq 0$ in a neighborhood of $s_0$ and is holomorphic for (5). Clearly, $c_k$ is a solution value for $V_k(s)$ when $s = 0$, that is, $$a_{k,0} = V_k(s_0) = c_k \neq 0, a_{k,0}^* = V_k^*(s_0) = c_k^* \neq 0. \quad (6)$$

In addition, by inserting the series expansions into (5a), the following equation is obtained:

$$(\Sigma_{q=0}^{\infty} a_{i,q}^* s^q) \cdot \Sigma_k Y_{ik} \Sigma_{q=0}^{\infty} a_{k,q} s^q = c_i^* \Sigma_k Y_{ik} c_k + s \cdot (S_i^* - c_i^* \Sigma_k Y_{ik} c_k).$$

By comparing the coefficients of $s^q$, we obtain the following equations for solving $a_{k,q}$, $q \geq 1$:

$$\Sigma_{q'=0}^{1} a_{i,q'}^* \Sigma_k Y_{ik} a_{k,(1-q')} = S_i^* - c_i^* \Sigma_k Y_{ik} c_k, q=1; \quad (7a)$$

$$\Sigma_{q'=0}^{q} a_{i,q'}^* \Sigma_k Y_{ik} a_{k,(q-q')} = 0, q \geq 2, \quad (7b)$$

which are linear equations of $a_{i,q}$ and $a_{i,q}^*$. Specifically, as $a_{k,0} = c_k$ is known, one can next solve $a_{k,1}$ and use equation (7a) for q=1. Then a linear system for solving $a_{k,1}$ and $a_{k,1}^*$ is derived, say $$(\Sigma_k Y_{ik} a_{k,0}) a_{i,1}^* + a_{i,0}^* \Sigma_k Y_{ik} a_{k,1} = S_i^* - c_i^* \Sigma_k Y_{ik} c_k, \quad (8a)$$

where the terms $\Sigma_k Y_{ik} a_{k,0}$, $a_{i0}^* \Sigma_k Y_{ik}$, and $S_i^* - c_i^* \Sigma_k Y_{ik} c_k$ have known values or can be calculated by the values of $a_{k,0}$. By equation (7b) for q≥2, a linear system (8b) for solving $a_{k,q}$ is derived as well.

$$(\Sigma_k Y_{ik} a_{k,0}) a_{i,q}^* + a_{i,0}^* \Sigma_k Y_{ik} a_{k,q} = \Sigma_{q'=1}^{q-1} a_{i,q'}^* \Sigma_k Y_{ik} a_{k,(q-q')}, q \geq 2. \quad (8b)$$

By inserting the series expansions into (5b)-(5d), other linear equations are derived for the coefficients, which are then incorporated into (8), which is a system of linear equations, say $$A_q \begin{bmatrix} a_q \\ a_q^* \end{bmatrix} = B_q,$$

where the entries in matrix $A_q$ and vector $B_q$ depend only on $a_l$ and $a_l^*$ for $1 \leq q-1$. So, $a_{k,q}$ and $a_{k,q}^*$ can be solved as (9).

$$V_k(s_0) \stackrel{(6)}{\Leftrightarrow} a_{k,0}, a_{k,0}^* \stackrel{(8)}{\Rightarrow} a_{k,1}, a_{k,1}^* \stackrel{(8)}{\Rightarrow} a_{k,2}, a_{k,2}^* \stackrel{(8)}{\Rightarrow} \ldots \stackrel{(8)}{\Rightarrow} a_{k,q}, a_{k,q}^* \stackrel{(8)}{\Rightarrow} \ldots \quad (9)$$

In some embodiments, an FFHE method based on embedded system (5) for solving the power flow problem is described as follows.

Step 0: (Initialization) Load the power system data and make the admittance matrix. Choose the value for $c_k$, and assign the value $c_k$ to $a_{k,0}$ for all k as (6). Select a number $\varepsilon > 0$ for the termination criterion. Set q=1, and go to step 1.

Step 1: (Series Coefficient) Solve the linear system (8) for $a_{k,q}$ and $a_{k,q}^*$. Go to step 2.

Step 2: (Matrix Construction) Set $\zeta = \lfloor q/2 \rfloor$ and $\eta = q - \zeta$. Form the matrices $\mathbb{L}_k^{\zeta,\eta}(1)$ and $\mathbb{M}_k^{\zeta,\eta}(1)$ with $\Delta s = 1$ for (3) and go to step 3, where $$\mathbb{L}_k^{\zeta,\eta}(1) \doteq \begin{pmatrix} a_{k,\zeta-\eta+1} & a_{k,\zeta-\eta+2} & \cdots & a_{k,\zeta+1} \\ \vdots & \vdots & \ddots & \vdots \\ a_{k,\zeta} & a_{k,\zeta+1} & \cdots & a_{k,\zeta+\eta} \\ \sum_{j=\eta}^{\zeta} a_{k,j-\eta} & \sum_{j=\eta-1}^{\zeta} a_{k,j-\eta+1} & \cdots & \sum_{j=0}^{\zeta} a_{k,j} \end{pmatrix};$$

-continued $$\mathbb{M}_k^{\zeta,\eta}(1) \doteq \begin{pmatrix} a_{k,\zeta-\eta+1} & a_{k,\zeta-\eta+2} & \cdots & a_{k,\zeta+1} \\ \vdots & \vdots & \ddots & \vdots \\ a_{k,\zeta} & a_{k,\zeta+1} & \cdots & a_{k,\zeta+\eta} \\ 1 & 1 & \cdots & 1 \end{pmatrix}.$$

Step 3: (Numerical Solution) Compute the ratio of determinants:

$$v_{k,q} = \det(\Psi(\mathbb{L}_k^{\xi,\eta}(1)))/\det(\Psi(\mathbb{M}_k^{\xi,\eta}(1))),$$

which gives a numerical solution to approximate $V_k$ in (4). Go to step 4.

Step 4: (Termination Criterion) Evaluate the max mismatch $\xi_q$ of (4) after replacing $V_k$ with $v_{k,q}$ as $$\xi_q \doteq \max\left\{\max_{i \in \mathcal{B}}\left|\text{Re}\left(v_{i,q}^* \sum_{k=1}^N Y_{ik} v_{k,q} - S_i^*\right)\right|, \max_{i \in \mathcal{B}_{PQ}}\left|\text{Im}\left(v_{i,q}^* \sum_{k=1}^N Y_{ik} v_{k,q} - S_i^*\right)\right|\right\},$$

where $\mathcal{B}$ is the set of all buses, $\mathcal{B}_{PQ} \subseteq \mathcal{B}$ is the set of PQ buses, and Re(z) and Im(z) are the real and imaginary parts of $z \in \mathbb{C}$, respectively. If $\xi_q < \varepsilon$, stop the computation and output the numerical solution $v_{k,q}$; otherwise, set q=q+1, and go to step 1. It is noteworthy that the halting criterion in this illustrative embodiment is the same as the termination criterion.

References herein to halting and/or termination criteria should be understood to encompass one or more halting criteria and/or one or more termination criteria. Embodiments utilizing a single halting criterion and/or a single termination criterion can be modified in a straightforward manner to utilize multiple halting criteria and/or multiple termination criteria, as will be readily appreciated by those skilled in the art.

Additional details regarding the operation of illustrative embodiments will now be described. Certain embodiments to be described below are similar in some respects to the embodiments previously described above.

Initially, further examples of various aspects of holomorphic embedding power flow will be described.

Let $S_i$ be the power injection at bus i, and let $V_k$ be the voltage at bus k. The power flow equation at the PQ bus i is expressed in the rectangular coordinates, namely $$\sum_{k=1}^N Y_{ik} V_k = S_i^*/V_i^*, \tag{10a}$$

where we denote the admittance matrix by $Y = (Y_{ik})_{N \times N}$, bus 1 is the slack bus, and $S_i^* = \mu_i - jv_i \in \mathbb{C}$ is the conjugate of the complex number $S_i = \mu_i + jv_i$. Here, $\mathbb{R}$ is the space of real numbers, and $\mathbb{C}$ is the set of complex numbers, with $\mu_i, v_i \in \mathbb{R}$. The PF equation at the PV bus i is given by $$\begin{cases} |V_i| - V_{i,sp} = 0, \\ P_i = \text{Re}\left(V_i \sum_{k=1}^N Y_{ik}^* V_k^*\right), \end{cases} \tag{10b, 10c}$$

where $P_i$ is the real power injection, and $V_{i,sp}$ is the specified voltage magnitude at bus i. Additionally, |z| and Re(z) denote the magnitude (norm) and the real part of $z \in \mathbb{C}$, respectively.

Some holomorphic embedding methods are configured with four stages to solve a power flow solution of (10), where (10) collectively denotes (10a), (10b) and (10c).

Stage 1: Construct an embedded system for (10).

Stage 2: Represent a power flow solution function of (10) by a power series expansion near a reference (initial) state, and solve for the coefficients of the power series.

Stage 3: Compute a rational approximant by the power series coefficients obtained at stage 2 and compose a numerical solution of (10) using the value of the rational approximant at the target state.

Stage 4: Repeat stages 2 and 3, for computing new numerical solutions of (10) by successively calculating higher-order coefficients in the power series and rational approximants until a termination criterion is met.

A. Stage 1—Construction of Embedded Systems

To solve PF problem (10) by an HE method, the problem is embedded into a "larger" problem. This is an example of what is more generally referred to herein as "flexible embedding." A "larger" problem for (10) is illustratively given by the following equations, $$\sum_{k=1}^N Y_{ik,trans} V_k(s) = \frac{sS_i^*}{V_i^*(s^*)} - sY_{i,shunt} V_i(s), \tag{11a}$$

$$V_i(s) * V_i^*(s) = 1 + s(|V_{i,sp}|^2 - 1), \tag{11b}$$

$$\sum_{k=1}^N Y_{ik,trans} V_k(s) = \frac{sP_i - jQ_i(s)}{V_i^*(s^*)} - sY_{i,shunt} V_i(s), \tag{11c}$$

where $s \in \mathbb{C}$ is a complex variable. Here, $Y_{ik,trans}$ and $Y_{i,shunt}$ are the series-branch part and shunt part, respectively, of the admittance matrix Y, and $Q_i$ is the reactive power. For system (11), where (11) collectively denotes (11a), (11b) and (11c), the reference state is $s_0 = 0$, and the target state is $s_1 = 1$.

The task of solving (11) is to obtain $V_k(s_1)$, $1 \le k \le N$. We say that system (11) is an embedded system for system (10) if the following conditions are met.

H1: At the target state $s = s_1$, (11a)-(11c) equal (10a)-(10c), respectively, which are the original (target) power flow equations.

H2: At the reference state $s = s_0$, the system has a known solution or can be easily solved.

Definition: A complex function $f$ is holomorphic at a point $s \in \Omega \subseteq \mathbb{C}$ if the following limit, $$f'(s) = \lim_{h \in \mathbb{C}, h \to 0} (f(s+h) - f(s))/h, \tag{12}$$

exists, where the displacement $h \in \mathbb{C}$ with $h \ne 0$, $s+h \in \Omega$. In addition, a complex function $f$ is said to be holomorphic in $\Omega$ if it is holomorphic at every point in $\Omega$. An embedded system is called holomorphic if the solution functions to the embedded system are holomorphic in s.

Given a continuous complex function, the relationship between being holomorphic and locally admitting a convergent power series representation can be established as follows.

Given a continuous function $f: \Omega \mapsto \mathbb{C}$, the following assertions are equivalent:
1) $f$ is holomorphic in $\Omega$; and
2) $f$ is developable into a convergent power series around each points $\hat{s} \in \Omega$.

Here, $\Omega \neq \emptyset$ is an open sets $\subseteq \mathbb{C}$, and a function $f: \Omega \mapsto \mathbb{C}$ is said to be developable into a power series around a points $\hat{s} \in \Omega$, for some r>0 with the open ball $\mathcal{B}_r(\hat{s}) \subset \Omega$ of radius r and centered at $\hat{s}$, there is a power series $\Sigma_{q=0}^{\infty} a_q (s-\hat{s})^q$ which converges in $\mathcal{B}_r(\hat{s})$ to $f\mathcal{B}_r(\hat{s})$ (i.e., a restriction of $f$ to $\mathcal{B}_r(\hat{s})$).

B. Stage 2—Power Series Representation

If the above solution function $V_k(s)$ is holomorphic for all k in a neighborhood $U \subseteq \mathbb{C}$ of $s=s_0$, then a (convergent) power series expansion in a disk $D \subseteq U$ centered at $s_0$ is ensured, say, $$V_k(s) = \Sigma_{q=0}^{\infty} a_{kq}(s-s_0)^q, \quad (13)$$

for $s \in D$, and the reciprocal is also represented in a power series where $$\frac{1}{V_k(s)} = \sum_{q=0}^{\infty} b_{kq}(s-s_0)^q.$$

The series coefficients $a_{kq}$ and $b_{kq}$ can be solved sequentially using the solution value $V_k(s_0)$ and the equations in the embedded system. This stage relies on the construction of embedded systems.

To compute $a_{kq}$ in (13), we proceed as follows. First, since the value $V_k(s)$ at the reference state $s=s_0$ is either known or easily solvable, it follows $$a_{k0} = V_k(s_0). \quad (14)$$

Given that $V_k(s) \neq 0$ for $s \in D$, the following equations hold on D.

$$1 \equiv V_k(s) \cdot \frac{1}{V_k(s)} = \sum_{q=0}^{\infty} a_{kq}(s-s_0)^q \cdot \sum_{q=0}^{\infty} b_{kq}(s-s_0)^q = \sum_{q=0}^{\infty} \sum_{m=0}^{q} a_{km} b_{k(q-m)}(s-s_0)^q.$$

A comparison of the coefficients of $(s-s_0)^q$ shows that $\Sigma_{m=0}^{q} a_{km} b_{k(q-m)} = 1$ for q=0, and $\Sigma_{m=0}^{q} a_{km} b_{k(q-m)} = 0$ for q≥1. So, the following equations hold for $a_{kq}$ and $b_{kq}$:

$$b_{k0} = 1/a_{k0},$$

$$b_{kq} = -\Sigma_{m=1}^{q} a_{km} b_{k(q-m)}/a_{k0}, q \geq 1. \quad (15)$$

By substituting (13) into the embedded system (11), we obtain from (11a) that $$\Sigma_{k=1}^{N} Y_{ik,trans} \Sigma_{q=0}^{\infty} a_{kq} s^q = sS_i^* \Sigma_{q=0}^{\infty} b_{iq}^* s^q - sY_{i,shunt} \Sigma_{q=0}^{\infty} a_{iq} s^q$$

for all s near $s_0=0$. Hence, a comparison of the coefficients for $(s-s_0)^q$, q≥0 gives $$\Sigma_{k=1}^{N} Y_{ik,trans} a_{k0} = 0; \text{ and}$$

$$\Sigma_{k=1}^{N} Y_{ik,trans} a_{kq} = S_i^* b_{i(q-1)}^* - Y_{i,shunt} a_{i(q-1)}, q \geq 1. \quad (16)$$

Similarly, by substituting (13) into (11b) and (11c), another set of equations for $a_{kq}$ and $b_{kq}$ can be derived for PV buses.

In short, $a_{kq}$ and $b_{kq}$ can be solved sequentially as follows:

$$V_k(s_0) \overset{(14)}{\Longleftrightarrow} a_{k0} \overset{(15)}{\to} b_{k0} \overset{(16)}{\to} a_{k1} \overset{(15)}{\to} b_{k1} \ldots \quad (17)$$
$$\ldots a_{kq} \overset{(15)}{\to} b_{kq} \overset{(16)}{\to} a_{k,q+1} \overset{(15)}{\to} b_{k,q+1}.$$

The power series (13) for $s=s_0$ thus can be determined by successively computing coefficients $a_{kq}$ from (14)-(16), as illustrated by (17).

C. Stage 3—Rational Approximants

Suppose that coefficients $a_{kq}$, $0 \leq q \leq l$, have been solved for some integer $l \geq 0$. Then, an approximation of $V_k(s_1)$ can be composed by a truncated series, e.g., $\Sigma_{q=0}^{l} a_{kq}(s_1-s_0)^q \approx V_k(s_1)$. Since such an approximation by the truncated series can be very disappointing even when evaluated within the radius of convergence of the series expansion, the rational approximants (e.g., the continued fraction and the Pade approximant) can provide better approximations within or beyond this radius of convergence. Pade approximants and continued fractions have been utilized to compose numerical solutions for problem (10). Note that the rational approximants always can be converted into an algebraic fraction that the numerator and the denominator are both polynomials. Without loss of generality, one thus may focus on discussing the Pade approximant. We recall that a Pade approximant, for function $V_k(s)$ with a series representation (13), takes the form $$[m/n]_k(s) = \frac{\alpha_{k0} + \alpha_{k1}(s-s_0) + \ldots + \alpha_{km}(s-s_0)^m}{\beta_{k0} + \beta_{k1}(s-s_0) + \ldots + \beta_{kn}(s-s_0)^n}, \quad (18)$$

which is a rational function such that $$\Sigma_{q=0}^{\infty} a_{kq}(s-s_0)^q - [m/n]_k(s) = O((s-s_0)^{m+n+1}).$$

Here, the integers m and n in $[m/n]_k(s)$ are the degrees of the polynomial in the numerator and the denominator, respectively, while the integer k in $[m/n]_k(s)$ is the bus number, and $a_{kq}$'s are the series coefficients in (13). The coefficients $\beta_{kq}$ of (18) can be obtained via the following equation:

$$\sum_{q=0}^{n} \beta_{kq}(s-s_0)^q \cdot \sum_{q=0}^{\infty} a_{kq}(s-s_0)^q = \sum_{q=0}^{m} \alpha_{kq}(s-s_0)^q + O((s-s_0)^{m+n+1}),$$

or via the following linear system:

$$\begin{bmatrix} a_{k,m-n+1} & a_{k,m-n+2} & \ldots & a_{km} \\ a_{k,m-n+2} & a_{k,m-n+3} & \ldots & a_{k,m+1} \\ \ldots & \ldots & \ldots & \ldots \\ a_{km} & a_{k,m+1} & \ldots & a_{k,m+n+1} \end{bmatrix} \begin{bmatrix} \beta_{kn} \\ \beta_{k,n-1} \\ \ldots \\ \beta_{k1} \end{bmatrix} = - \begin{bmatrix} a_{k,m+1} \\ a_{k,m+2} \\ \ldots \\ a_{k,m+n} \end{bmatrix},$$

in which $\beta_{k0}=1$ and $a_{kq}=0$ for q<0. If $\beta_{kq}$ is determined, then $\alpha_{kq}$ can be obtained by the following equation:

$$\alpha_{kq} \Sigma_{q'=0}^{min\{n,q\}} \beta_{kq'} a_{k(q-q')}.$$

Hence, a numerical power flow solution to the original problem (10) is given by $[m/n]_k(s_1)$, which is the value of the Pade approximant at the target state $s=s_1$.

D. Stage 4—Termination Criterion

A widely used quality criterion for power flow solution is the (infinity) norm of mismatches of the two sides of (10) (i.e., the max mismatch). This criterion is also employed in commercial packages to evaluate the quality of the numerical power flow solution. To apply this criterion, we select an $\in > 0$ and substitute the value of the Pade approximant at the target state, say $[n/n]_k(s_1)$, for $V_k$ in (10). If the norm of mismatches $> \in$, an updated value $[n/n]_k(s_1)$ with larger n is computed by repeating stages 2 and 3; otherwise, a satisfactory numerical power flow solution is obtained, and the computation can be terminated. This criterion differs from the one based on the difference between successive numerical solutions. We note the convergence of a sequence of numerical solutions to a limit point that may not be a numerical solution of the power flow equation, that is, a limit point may not be a power flow solution.

Conventional HE methods utilizing (11) as the embedded system generally perform less effectively than the popular power flow methods (e.g., NR and FD), and a slow-down performance roughly by a factor of 30 or over a hundred has been reported when solving test cases with 1000 or more buses. Such discouraging performance of these conventional HE methods can be attributed in part to the following factors.

First, the embedded system (11) can only support some certain point as the initial guess. About 10~20 terms in the series expansion are usually required to compute a satisfactory numerical solution by rational approximants for $\in_1=1.0\times10^{-4}$, whereas 35 or more ($\geq 100$ in some cases) terms are required when $\in_2=1.0\times10^{-10}$. If the embedded system (11) is used, the required number of terms (to meet a criterion) cannot be reduced, even if better initial guesses are available, because it takes only certain points as the initial guess. This motivates the development of flexible embedded systems in the illustrative embodiments disclosed herein.

Second, we have observed, as has already been reported by other researchers, that the calculation of rational approximants can take up most of the execution time. Thus, a more efficient methodology for composing numerical solutions can potentially improve the numerical performance of the HE method.

To develop practical HE-based PF methods, we design (i) novel embedded systems, (ii) new efficient numerical schemes, and (iii) integrate them to develop FFHE methods with the following outstanding features:

1. The new embedded systems can take any state (not just some certain points) as the initial guess, providing great flexibility and usually only requiring about 10 terms in the power series expansion for small, medium, and large test systems.

2. It computes a numerical power flow solution directly by a ratio of matrix determinants without computing the coefficients $\alpha_{kq}$ and $\beta_{kq}$ of Pade approximant (18).

3. The novel method integrating new, flexible embedded systems enjoys the advantage of being flexible in its initial guess and bus type (when Q-limits are enforced). For instance, the initial guess can be provided by the Gauss-Seidel (GS) power flow method (e.g., after three iterations) to form a GS-assisted FFHE method. A Newton-assisted FFHE method is also disclosed herein. This can bring about a great reduction in cost (e.g., the runtime, the number of terms in a power series expansion, and memory requirement) and dramatic improvement in convergence if integrated with other PF methods.

New and flexible embedded systems for the power flow problem (10) are disclosed herein to support the modeling of both PQ and PV buses. Efficient numerical schemes for solving problem (10) are also described below.

A. Embedded System and FFHE

The following new embedded system is introduced for (10):

$$V_i^*(s^*)\Sigma_k Y_{ik}V_k(s)=c_i^*\Sigma_k Y_{ik}c_k s\{S_i^*-c_i\Sigma_k Y_{ik}c_k\}, \tag{19a}$$

$$V_i^*(s)V_i^*(s^*)=c_i c_i^*+s\{|V_{i,sp}|^2-c_i c_i^*\}, \tag{19b}$$

$$V_i^*(s^*)\Sigma_k Y_{ik}V_k(s)+V_i(s)\Sigma_k Y_{ik}^* V_k^*(s^*)=\{c_i\Sigma_k Y_{ik}c_k + c_i^*\Sigma_k Y_{ik}^* c_k^*\}+s\{2P_i-(c_i^*\Sigma_k Y_{ik}c_k+c_i\Sigma_k Y_{ik}^* c_k^*)\}. \tag{19c}$$

Equations (19a)-(19c) correspond to equations (10a)-(10c), respectively, with the reference state $s_0=0$ and the target state $s_1=1$. Hence, conditions H1 and H2 introduced above are satisfied. The constant $c_k \in \mathbb{C}\setminus\{0\}$ is adjustable and can be of any pre-specified value. Note that $V_k(0)=c_k$ gives a solution for (19) at $s_0=0$, and $V_1(s)\equiv c_1$ for all $s\in \mathbb{C}$.

The construction of a flexible embedded system is not unique, and other flexible systems can also be derived by modifying existing HE formulations. Note that usually, a system of linear equations $A_q X_q = B_q$ is derived to solve the vector $X_q$ of unknowns (e.g., the series coefficient $a_{iq}$), and the matrix $A_q$ for system (19) can have entries consisting of the products $a_{iq'}a_{kq''}$ for q', q''<q, i$\neq$k by (22). So, the construction of $A_q$ for system (19) can be more complex and less efficient than that for system (11) because it does not need to evaluate the products $a_{iq'}a_{kq''}$ to construct $A_q$ for (11). Nevertheless, this shortcoming, caused by the construction of $A_q$ for (19), is offset, as shown in the numerical studies by the speedups achieved by the reduced number of steps (owing to the flexible start) and the efficient numerical schemes for obtaining a numerical solution (without calculating the Pade approximant) in the novel FFHE method of the present embodiment. The overall performance of FFHE is comparable with Newton's and fast-decoupled Newton power flow methods. If utilizing more efficient flexible embedded systems, the FFHE method will perform even better.

The following procedure computes the coefficients $a_{kq}$ in the series expansion (13) for the new embedded system (19):

$$V_k(s)=\Sigma_{q=0}^\infty a_{kq}s^q, \text{ and } V_k^*(s^*)=\Sigma_{q=0}^\infty a_{kq}s^q.$$

We take (19a) as an example to show the procedure. Suppose that the solution function $V_k(s)$ for (19) is holomorphic and nonzero in a neighborhood of $s_0$. So, $1/V_k(s)$ has an expansion as $1/V_k(s)=\Sigma_{q=0}^\infty b_{kq}s^q$. Clearly, $c_k$ provides a solution value for $V_k(s)$ when $s=s_0=0$, that is, $$a_{k0}=V_k(s_0)=c_k\neq 0. \tag{20}$$

Observe the following $$1 = V_k(s) \cdot \frac{1}{V_k(s)} = \sum_{q=0}^\infty a_{kq}s^q \cdot \sum_{q=0}^\infty b_{kq}s^q = \sum_{q=0}^\infty \sum_{q'=0}^q a_{kq'}b_{k(q-q')}s^q.$$

This yields a system of equations for $a_{kq}$ and $b_{kq}$ where $$b_{k0}=1/a_{k0},$$

$$b_{kq}=-\Sigma_{q'=1}^q a_{kq'}b_{k(q-q')}/a_{k0}, q\geq 1. \tag{21}$$

By inserting the series expansions into (19a), the following equation is obtained:

$$(\Sigma_{q=0}^{\infty} a_{iq}^* s^q) \cdot \Sigma_k Y_{ik} \Sigma_{q=0}^{\infty} a_{kq} s^q = c_i^* \Sigma_k Y_{ik} c_k + s \cdot (S_i^* - c_i^* \Sigma_k Y_{ik} c_k).$$

By comparing the coefficients of $s^q$, we obtain the following relationship that $\Sigma_{q'=0}^{1} a_{iq'} \Sigma_k Y_{ik} a_{k(1-q')} = S_i^* - c_i^* \Sigma_k Y_{ik} c_k$ for $q=1$, and $\Sigma_{q'=0}^{q} a_{iq'} \Sigma_k Y_{ik} a_{k(q-q')} = 0$ for $q \geq 2$, which are linear equations of $a_{iq}$ and $a_{iq}^*$. By inserting (13) into (19b) and (19c), other equations are derived for the coefficients, which are then incorporated into the above relationship. Let $X_q$ be the vector of unknowns, such as $a_{kq}$ and $a_{kq}^*$, $1 \leq k \leq N$. Clearly, a system of linear equations can be derived from the above relationship to solve $X_q$ (e.g., $a_{iq}$ and $a_{iq}^*$), say $$A_q X_q = B_q, \quad (22)$$

where the entries of the (sparse) coefficient matrix $A_q$ and the column vector $B_q$ are the compositions of $Y_{ik}$, $S_i$, $c_i$, $a_{kq'}$, $a_{kq'}^*$ for $q' < q$, and so on; but excluding $a_{kq}$ and $a_{kq}^*$. So, $a_{kq}$ and $b_{kq}$ can be solved by the following procedure:

$$V_k(s_0) \overset{(20)}{\Longleftrightarrow} a_{k0} \overset{(21)}{\to} b_{k0} \overset{(22)}{\to} a_{k1} \overset{(21)}{\to} b_{k1} \ldots \quad (23)$$
$$\ldots a_{kq} \overset{(21)}{\to} b_{kq} \overset{(22)}{\to} a_{k,q+1} \overset{(21)}{\to} b_{k,q+1}.$$

Given that $a_{kq'}$ is known or solved for all $1 \leq k \leq N$, $0 \leq q' \leq q$, the matrices $L_k^{m,n}(\Delta s)$ and $M_k^{m,n}(\Delta s)$ are formed below to effectively compose a numerical solution for problem (10) shown below.

Here, $\Delta s \doteq (s_1 - s_0)$ is fixed and known; and the integers m, $n \geq 0$ satisfy $q = m+n$ for which usually one can select $m = \lfloor q/2 \rfloor$ and $n = q - m$, and $\lfloor y \rfloor$ is the greatest integer $\leq y$.

To solve $V_k(s_1)$ for system (19), the following FFHE power flow method is used.

FFHE Power Flow Method:

Step 0: (Initialization) Load the power system data, and make the admittance matrix. Choose the value for $c_k$, and assign the value $c_k$ to $a_{k0}$ for all k as (20). Select a number $\varepsilon > 0$ for the termination criterion. Set $q=1$, and go to step 1.

Step 1: (Series Coefficient) Form the linear system $A_q X_q = B_q$ as (22), and solve for $X_q$. Retrieve the value of $a_{kq}$ directly from $X_q$ (because $a_{kq}$ is an element of vector $X_q$).

Step 2: (Matrix Construction) Set $m = \lfloor q/2 \rfloor$ and $n = q - m$. Form the matrices $L_k^{m,n}(1)$ and $M_k^{m,n}(1)$ with $\Delta s = 1$ for (19), where $$L_k^{m,n}(1) \doteq \begin{pmatrix} a_{k,m-n+1} & a_{k,m-n+2} & \cdots & a_{k,m+1} \\ \vdots & \vdots & \ddots & \vdots \\ a_{k,m} & a_{k,m+1} & \cdots & a_{k,m+n} \\ \sum_{j=1}^{m} a_{k,j-n} & \sum_{j=n-1}^{m} a_{k,j-n+1} & \cdots & \sum_{j=0}^{m} a_{kj} \end{pmatrix},$$

$$M_k^{m,n}(1) \doteq \begin{pmatrix} a_{k,m-n+1} & a_{k,m-n+2} & \cdots & a_{k,m+1} \\ \vdots & \vdots & \ddots & \vdots \\ a_{k,m} & a_{k,m+1\ldots} & \cdots & a_{k,m+n} \\ 1 & 1 & \cdots & 1 \end{pmatrix},$$

$$L_k^{m,n}(\Delta s) \doteq \begin{pmatrix} a_{k,m-n+1} & a_{k,m-n+2} & \cdots & a_{k,m+1} \\ \vdots & \vdots & \ddots & a_{k,m+1} \\ a_{k,m} & a_{k,m+n} & \cdots & \\ \sum_{j=n}^{m} a_{k,j-n}(\Delta s)^j & \sum_{j=n-1}^{m} a_{k,j-n+1}(\Delta s)^j & \cdots & \sum_{j=0}^{m} a_{kj}(\Delta s)^j \end{pmatrix},$$

$$M_k^{m,n}(\Delta s) \doteq \begin{pmatrix} a_{k,m-n+1} & a_{k,m-n+2} & \cdots & a_{k,m+1} \\ \vdots & \vdots & \ddots & \vdots \\ a_{km} & a_{k,m+1\ldots} & a_{k,m+n} & \\ (\Delta s)^n & (\Delta s)^{n-1} & \cdots & 1 \end{pmatrix}.$$

Step 3: (Numerical Solution) Compute the following ratio $v_{k,q}$ of matrix determinants:

$$v_{k,q} = \det(\Psi(L_k^{m,n}(\Delta s))) / \det(\Psi(M_k^{m,n}(\Delta s))), \quad (24)$$

in which $\det(\bullet)$ is the determinant of a square matrix and $\Psi$ is a linear map of full rank. Here, $v_{k,q}$ gives a numerical solution to approximate $V_k$ in (10).

Step 4: (Termination Criterion) Evaluate the max mismatch $\eta_q$ of (10) after replacing $V_k$ with $v_{k,q}$ for all k in (10) as $$\eta_q \doteq \max \left\{ \max_{i \in \mathcal{B}} \left| \text{Re} * v_{i,q}^* \sum_{k=1}^{N} Y_{ik} v_{k,q} - S_i^* \right|, \max_{i \in \mathcal{B}_{PQ}} \left| \text{Im} \left( v_{i,q}^* \sum_{k=1}^{N} Y_{ik} v_{k,q} - S_i^* \right) \right| \right\},$$

where $\mathcal{B}$ denotes the set of (PV and PQ) buses, $\mathcal{B}_{PQ} \subseteq \mathcal{B}$ is the set of PQ buses, and $\text{Re}(z)$ and $\text{Im}(z)$ are the real and imaginary parts of $z \in \mathbb{C}$, respectively. If $\eta_q < \varepsilon$, stop the computation; otherwise, set $q = q+1$, and go to step 1.

The new embedded system (19) is constructed for flexibility. This system offers the flexibility of accepting any initial guess such as a warm start, cold start, or flat start, a solution from a DC power flow, a solution from a simplified or popular power flow such as GS power flow, Newton power flow, or another intelligent start as the initial guess, which is the solution for the reference state $s_0$. This flexibility makes FFHE fast, as will be shown numerically later.

Note that the map $\Psi$ in (24) offers a pre-conditioner for the determinant problems. Moreover, formula (24) for composing a numerical solution is motivated by the property that the Pade approximant (18) for HE methods can be calculated via another approach in accordance with the following.

The $[m/n](z)$ Pade approximant of the power series $\Sigma_{q=0}^{\infty} \mu_q z^q$ is given by $$[m/n](z) = \det(\mathcal{P}^{[m/n]}(z))/\det(Q^{[m/n]}(z)),$$

where the matrices $\mathcal{P}^{[m/n]}(z)$ and $Q^{[m/n]}(z)$ are defined by $$\mathcal{P}^{[m/n]}(z) \doteq \begin{pmatrix} \mu_{m-n+1} & \mu_{m-n+2} & \cdots & \mu_{m+1} \\ \vdots & \vdots & \ddots & \vdots \\ \mu_m & \mu_{k,m+1} & \cdots & \mu_{m+n} \\ \sum_{j=n}^{m} \mu_{j-n} z^j & \sum_{j=n-1}^{m} \mu_{j-n+1} z^j & \cdots & \sum_{j=0}^{m} \mu_j z^j \end{pmatrix},$$

$$Q^{[m/n]}(z) \doteq \begin{pmatrix} \mu_{m-n+1} & \mu_{m-n+2} & \cdots & \mu_{m+1} \\ \vdots & \vdots & \ddots & \vdots \\ \mu_m & \mu_{m+1} & \cdots & \mu_{m+n} \\ z^n & z^{n-1} & \cdots & 1 \end{pmatrix}.$$

A rational approximant to approximate $V_k(s)$ is given by the following ratio of determinants:

$$[m/n]_k(s) = \det(L_k^{m,n}(s-s_0))/\det(M_k^{m,n}(s-s_0)).$$

But an explicit expression for the approximant $[m/n]_k(s)$ is not necessary because only its value at $s=s_1$ is meaningful when attempting to obtain a numerical solution for $V_k$ in (10). So, (24) is employed in FFHE to obtain a numerical solution unless the values $[m/n]_k(s)$ for other $s \notin \{s_0, s_1\}$ are needed. Note that the determinants of $L_k^{m,n}(\Delta s)$ and $M_k^{m,n}(\Delta s)$ usually are closer to 0 for larger m and n if the series (13) is convergent. For instance, when simulating the 4-bus power system test case "case4gs" in MATPOWER, one can observe that $$|\det(L_k^{m,n}(\Delta s))|, |\det(M_k^{m,n}(\Delta s))| \approx 1.0e-35$$

for $m=n=5$ and $\Delta s=1$, whereas the two determinants are of the scale 1.0 e−50 for $m=n=6$. So, a preconditioning using map $\Psi$ is useful in improving the numerical robustness.

The issue arises of whether the proposed numerical scheme (24) for computing a numerical solution can positively affect the overall performance, as compared with other HE methods that compute a Pade approximant first and then value it at $s=s_1$. Usually, $\Psi$ in (24) is set to a linear transformation by multiplying the inverse of $M_k^{m,n}$ (or $L_k^{m,n}$) or a diagonal matrix derived from the eigenvalues of $M_k^{m,n}$ (or $L_k^{m,n}$). Two key points need to be clarified.

First, a comparison based on a complexity analysis may shed little light on its practicability. The scheme (24) often employs matrix operations, e.g., the matrix multiplication and inversion, as well as determinant calculation, which are of complexity $O(q^{2.376})$ for $q \times q$ matrices. On the other hand, methods have been developed to compute approximants $[m/n]_k, m+n \leq q$ with complexity $O(q^2)$. One may question an assertion that scheme (24) must be slower than schemes based on rational approximants. This question is hard to answer, since complexity analysis provides insight for the asymptotical worst-case performance only. One famous example of the simplex method and the ellipsoid method for linear programming can highlight the limitation of complexity analysis: the simplex method is strikingly efficient in practice, albeit it is of exponential worst-case complexity; whereas the practical performance of the ellipsoid method is discouraging and cannot compete with the simplex method, despite the fact that theoretically the ellipsoid method can solve linear programs in polynomial time.

Second, it is noteworthy that scheme (24) only generates a complex number, but a scheme based on rational approximants may temporarily generate a vector with its length proportional to the order of the approximant to derive a numerical solution. This scheme becomes costly when computing high-order approximants. These factors can either make a difference or have a negligible effect, depending on the contributions of other factors. In brief, it is not appropriate to predict and compare the performance of a numerical method simply by a complexity analysis. To offer easily assessable results, numerical evaluations of the proposed method on many test cases are conducted and compared with NR on the same platform, to be discussed later.

An illustrative embodiment providing an FFHE-based method for power flow with Q-limits will now be described.

Handling generator reactive power (Q) limits is important in power flow computation. To simulate the mechanism of PV-PQ bus-type switching, an HE method could compute PF solutions by setting the flat start as the initial guess after each switching. On the other hand, using the new system (19), the PF solution obtained before a switching can be assigned to $c_k$'s in (19), and FFHE solves the PF problem after the switching, as will be described in more detail below in conjunction with the flow diagram of FIG. 6. This differs from conventional approaches to PV-PQ bus-type switching.

The numerical evaluation results presented elsewhere herein will show that the novel scheme proposed for the power flow problems with Q-limits based on FFHE can achieve a speedup that is tens of times or more faster than conventional HE-based methods on large test systems. A scheme is proposed below to implement the PV-PQ bus-type switching mechanism based on the FFHE method presented in the previous section.

Step 1: Initialize the generator buses as PV buses.

Step 2: Solve power flow problem (10) by FFHE using the embedded system (19), and set the initial guess to the default value or the PF solution calculated before the switching.

Step 3: Determine the buses that reach the Q-limits using current solution values, and switch these buses to PQ buses.

Step 4: Repeat steps 2 and 3 until all Q-limits are met.

FIG. 6 illustrates the above-described holomorphic embedding algorithm with a switching mechanism for dealing with reactive power limits. The algorithm in this embodiment comprises a process 600 having steps 602 through 616 which are illustratively executed by processing platform, utilizing processor, memory and network interface components of one or more processing devices of the processing platform.

In step 602, the process is initialized. This illustrative includes initializing the generator buses of the electric power system as PV buses.

In step 604, an initial iteration of an FFHE algorithm of the type described elsewhere herein is performed to obtain a prospective solution to the set of power flow equations subject to the Q-limits.

In step 606, a determination is made as to whether or not all of the PV buses satisfy the Q-limits in the prospective solution. If all of the PV buses satisfy the Q-limits in the prospective solution, the prospective solution is designated as a final solution and the process terminates in step 616 as shown. Otherwise, the process moves to step 608.

In step 608, a determination is made as to whether or not the calculated $Q_i$ values are greater than the maximum Q-limit. An affirmative determination for a given PV bus in step 608 causes the PV bus to be switched to a PQ bus using the maximum Q-limit in step 610. A negative determination for a given PV bus in step 608 causes the PV bus to be switched to a PQ bus using the minimum Q-limit in step 612.

In step 614, the flexible embedded system is updated using the prospective solution obtained prior to the switching in steps 610 and 612, and the process then returns to step 604 to execute another iteration of the FFHE algorithm. The resulting solution is then tested in step 606, and the process then either terminates in step 616 if the termination criterion is met, or performs steps 608 through 614 and then returns to step 606 to perform another iteration of the FFHE algorithm.

The FFHE-based method integrating the above-described switching mechanism has a number of advantageous features. First, the flexible embedded systems can take the PF solution obtained before a switching as the start for solving the PF problem after the switching. This leads to significant reductions in (a) the number of required steps, (b) the number of terms in the series expansion to be computed, and (c) the runtime. Since the PF solutions obtained before and after a switching are usually close to each other, by taking the PF solution (before the switching) as the initial guess, the PF problem after the switching is faster solved by FFHE than using a flat start as the initial guess. The disclosed FFHE method can also integrate other switching mechanisms to solve power flow problems with Q-limits.

Other illustrative embodiments provide GS-assisted FFHE and FD-assisted FFHE methods, as will now be described.

These embodiments exploit the flexibility of initial guesses offered by the FFHE-based PF method. FFHE is not guaranteed to always perform well when taking a default start, the flat start, or any other start as the initial guess. Choosing a promising initial guess for FFHE remains a sophisticated issue.

Of the popular power flow methods, such as Newton's method and the fast-decoupled Newton method (FD-XB), these methods can diverge or exhibit slow convergence. This gives rise to the integration of an FFHE method with other PF methods (e.g., GS and FD-XB). We thus suggest the following two FFHE-based PF methods:

1. A GS-assisted FFHE-based PF method.
2. A Fast-decoupled-assisted FFHE-based PF method.

The motivation behind the above two PF methods is that the initial guess for the FFHE-based PF method is provided by the GS method or by the FD-XB method after a few iterations, say about three iterations, using the default start or another start.

The GS-assisted FFHE method is as follows:

Step 1: Apply GS using the default start (or another start) for K (e.g., K=3) iterations and output the numerical solution.

Step 2: Apply the FFHE-based power flow method using the numerical solution of step 1 as the initial guess.

The FD-assisted FFHE method is as follows:

Step 1: Apply FD-XB using the default start (or other starts) for K (e.g., K=4) iterations and output a numerical solution.

Step 2: Apply the FFHE-based power flow method using the numerical solution of step 1 as the initial guess.

It will be shown numerically that the above two variants of the FFHE method can be more robust, as compared with the FFHE method. Three cases (i.e., case3hem, case9241pegase, and case13659pegase) are employed to evaluate GS, FD-XB, and GS-assisted FFHE and FD-assisted FFHE methods. Here, case3hem is a small test case, while case9241pegase and case13659pegase are the largest two test cases in the current version of MATPOWER.

Figure 7:
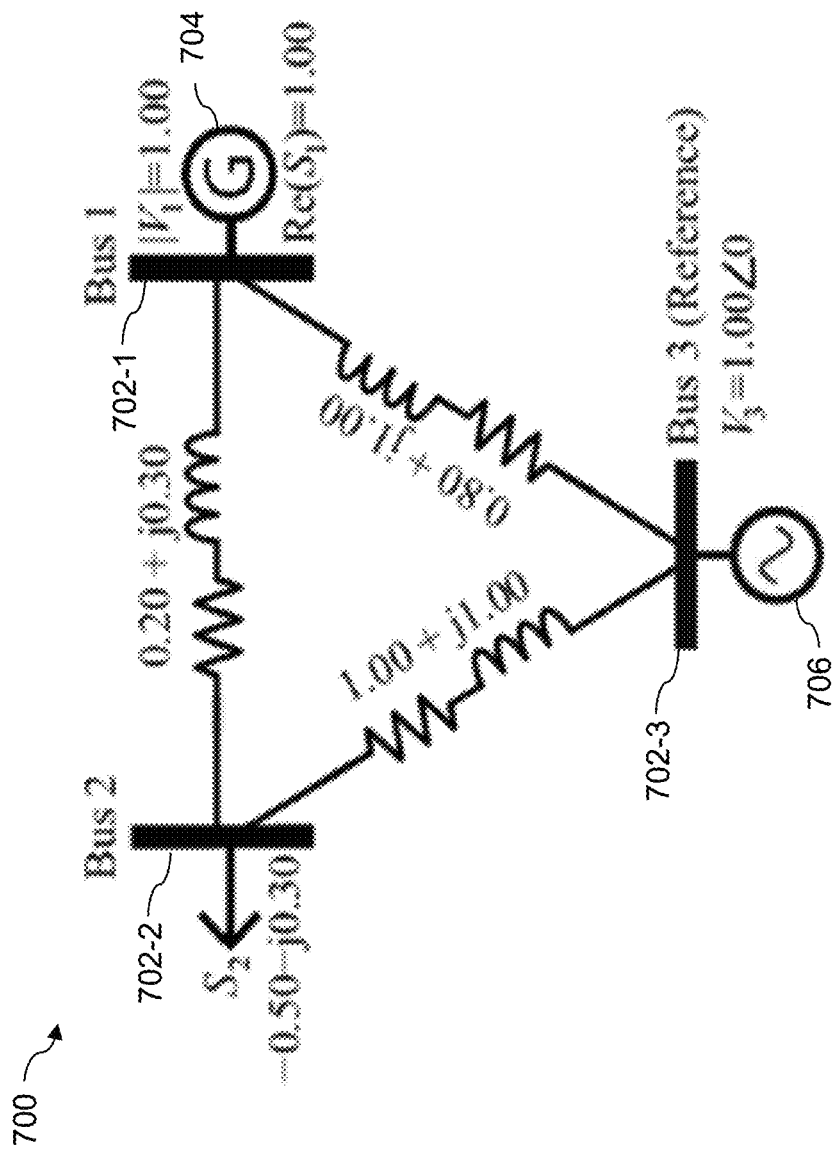
FIG. 7 shows a one-line diagram for an electric power system comprising a generator bus, a load bus and a reference bus.

FIG. 7 shows a one-line diagram for an electric power system 700 comprising a generator bus 702-1, a load bus 702-2 and a reference bus 702-3, also denoted as Bus 1, Bus 2 and Bus 3, respectively. The generator bus 702-1 is associated with a generator 704, and the reference bus 702-3 is associated with a reference source 706. This illustrative electric power system corresponds to the example case referred to herein as case3hem, with a local voltage control at Bus 1 and the reference bus at Bus 3.

Figure 8:
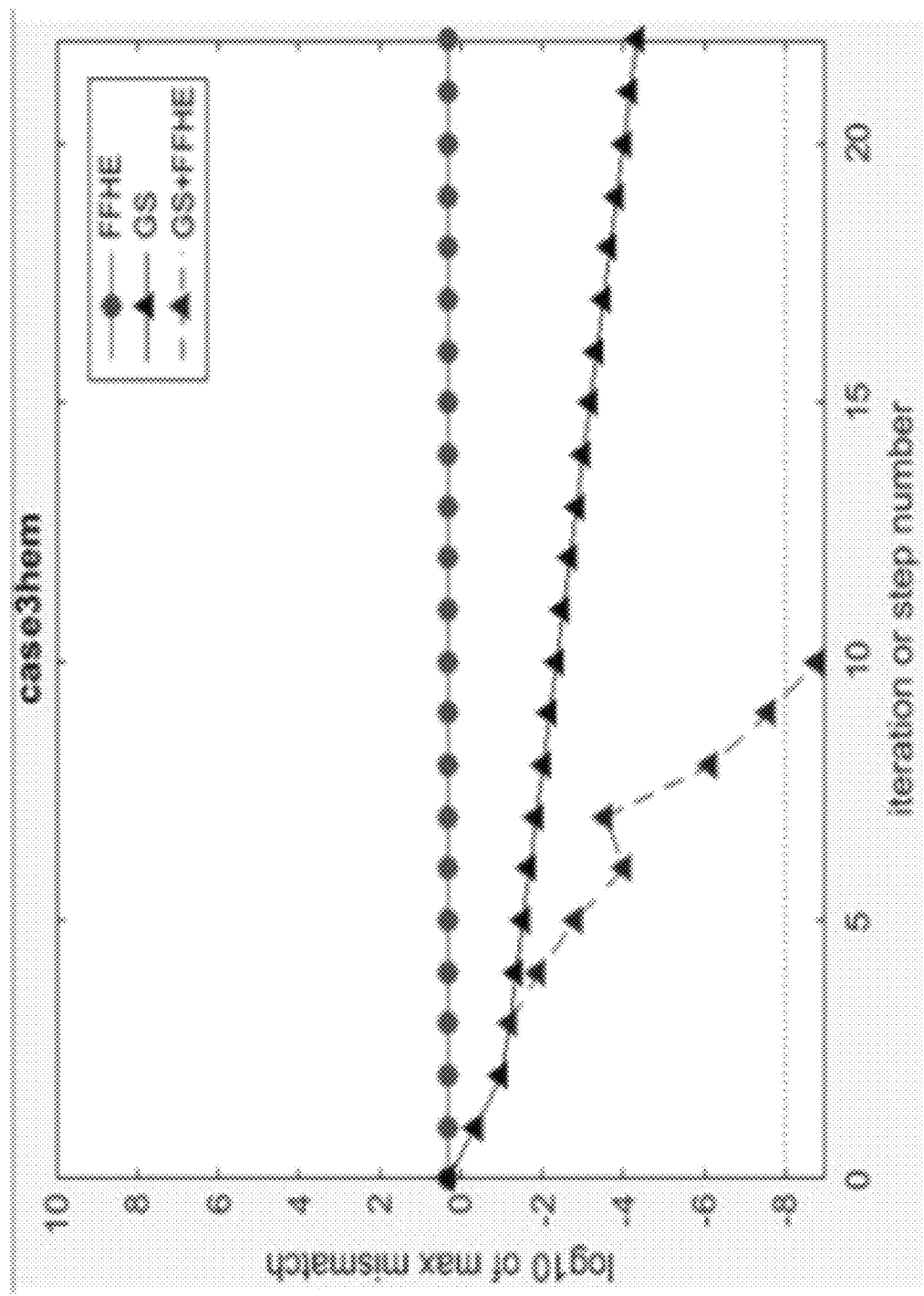
FIGS. 8 through 16 are graphical plots comparing performance of illustrative embodiments to various conventional approaches.

Applying the FFHE method to compute a power flow solution of case3hem using $c_1=0.8+j0.6$ and $c_2=0.7-j0.33$ as the initial guess, the max mismatch stays fairly constant for the first 20 steps (see the curve marked by filled circles in FIG. 8), and the GS method converges very slowly when using the same initial guess and cannot reduce the max mismatch to 1.0 e-8 p.u. within 44 iterations (see the solid curve marked by filled triangles in FIG. 8). Notably, the suggested GS-assisted FFHE method (with K=3) is able to reduce the max mismatch to 1.0 e-8 in just 7 steps and obtain a power flow solution $V_1=0.8848+j0.4659$ and $V_2=0.7630+j0.2394$ (see the dashed curve marked by filled triangles in FIG. 8).

Figure 9:
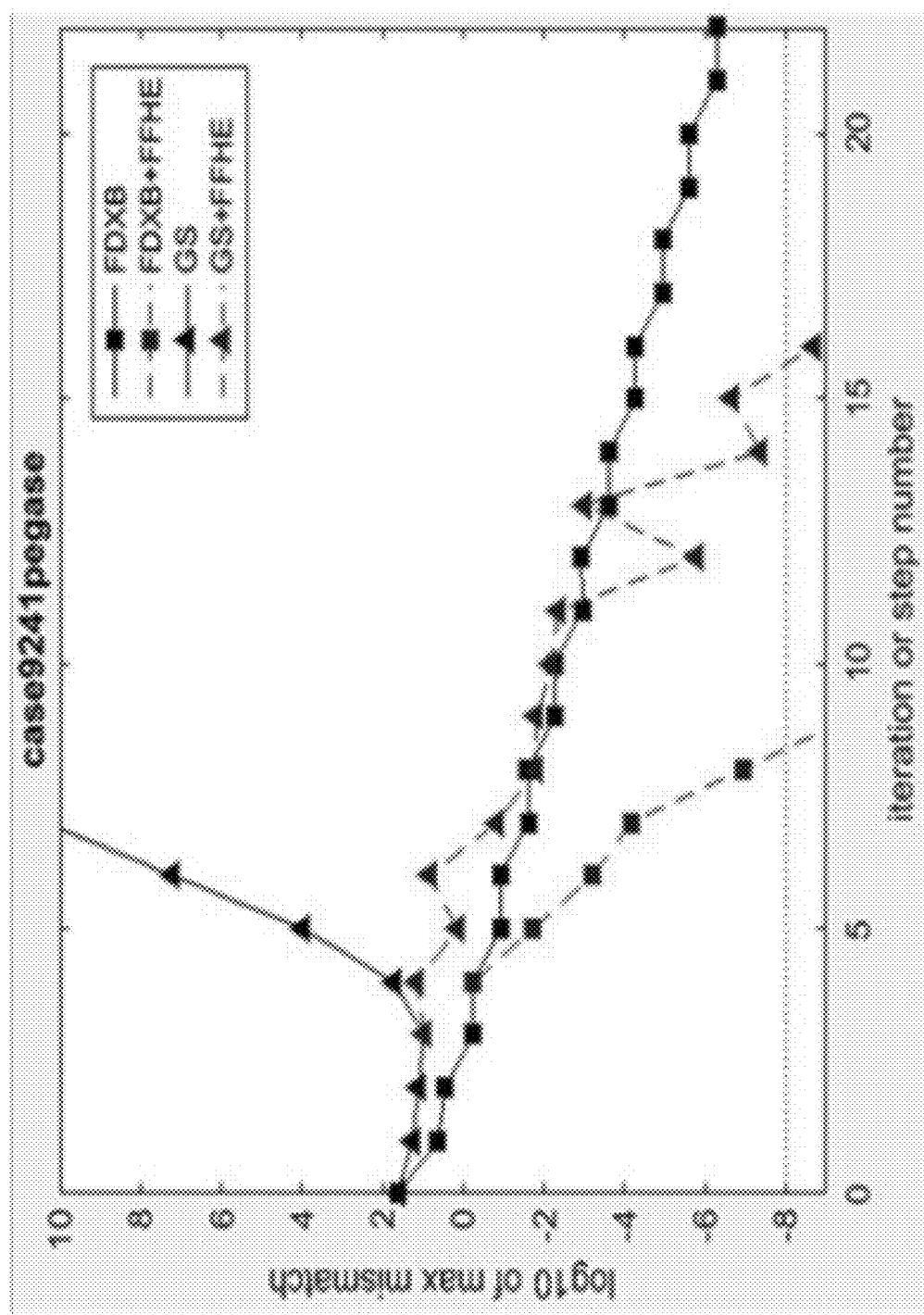
Figure 10:
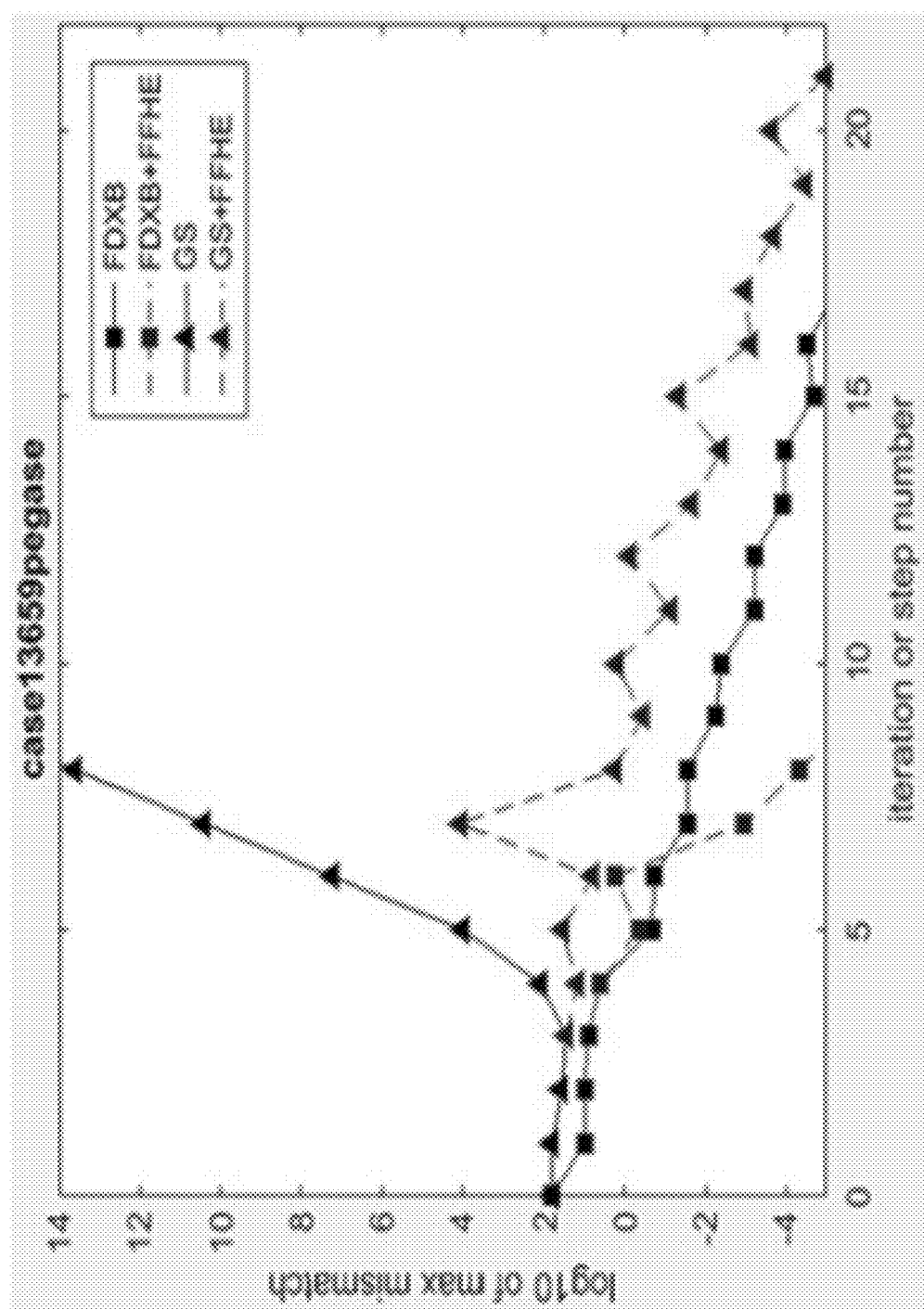

For large cases, i.e., case9241pegase and case13659pegase, the default start provided in MATPOWER is used as the initial guess for GS and FD-XB. As shown in FIGS. 9 and 10, GS diverges, and the max mismatch increases rapidly after a few iterations (see the solid curve marked by filled triangles), while FD-XB converges very slowly in both cases (see the solid curve marked by filled squares) and the mismatch is still greater than 1.0 e-5 p.u. after 15 iterations. On the other hand, the suggested GS-assisted FFHE and FD-assisted FFHE methods converge and perform fast.

As an example, take case9241pegase. The GS-assisted FFHE method (with K=3) converges and reduces the max mismatch below 1.0 e-8 p.u. in 13 steps (see the dashed curve marked by filled triangles in FIG. 9) although the GS method diverges. Moreover, FD-XB needs 27 iterations (i.e., 14 P-iterations and 13 Q-iterations) to converge and reduces the max mismatch to 1.0 e-8 p.u. The suggested FD-assisted FFHE method needs 9 steps to converge, as shown by the dashed curve marked by filled squares in FIG. 9. These numerical results demonstrate the effectiveness brought about by the flexibility of FFHE for enhancing convergence behavior and the rate of convergence. Similar observations can be made for case13659pegase based on the evaluation results shown in FIG. 10.

In summary, although the performance of FFHE, like other methods, is sensitive to the choice of the initial guess, the GS-assisted FFHE and FD-assisted FFHE methods can significantly outperform the GS and FD-XB Newton methods, respectively, in solving both small and large test cases and out-perform FFHE in some test cases.

Illustrative embodiments disclosed herein provide FFHE methods that include (i) novel embedded systems, and (ii) effective numerical schemes. The novel embedded systems can take any state as an initial guess, which provides great flexibility. To improve the overall performance in solving the power flow problems, the following two variants of FFHE have been described: (1) the GS-assisted FFHE-based PF method; and (2) the fast-decoupled-assisted FFHE-based PF method. Although the performance of FFHE is sensitive to the choice of the initial guess, the proposed GS-assisted FFHE and FD-assisted FFHE methods can significantly outperform the GS and FD-XB Newton methods, respectively, in solving small and large cases, and outperform FFHE in some test cases.

A bus-type switching mechanism has been developed and integrated with FFHE methods as disclosed herein to deal with the power flow problems with Q-limits. To implement the novel FFHE method, Pade approximants are not explicitly calculated. Instead, numerical solutions are computed using a new scheme based on the determinant calculation. The numerical studies, using power flow test cases with 3 to 13659 buses, suggest that an illustrative embodiment of the FFHE method generally performs better than NR in runtime and better than FD in robustness. The FFHE method is about ten or more times faster than conventional HE when applied to small, medium, and large test cases with or without Q-limits. The robustness of FFHE has also been shown in computing voltage collapse points for large cases and compared favorably with the continuation power flow method.

Some embodiments of FFHE employ only the sparse matrix routines and do not use code optimization. No parallel computing is performed. Also, no sophisticated means are applied to handle the calculation of numerical solutions, such as only calculating the Pade approximant at a few sentinel nodes to detect the convergence from the voltage deviations. Hence, potential for further improving the numerical performance of FFHE is still large via code optimization, parallel computing, and domain knowledge in other embodiments.

As indicated above, we have conducted a series of numerical tests on illustrative embodiments and obtained the following performance of FFHE compared with other power flow methods when solving PF problems without Q-limits. The power system test cases with 4 to 6515 buses are available in MATPOWER and have been simulated to evaluate several methods for solving the PF problem with no Q-limits. The default initial guesses for these cases (provided in MATPOWER) are used. Here, only the initial guesses for the test cases with 4, 5, 9, 24, and 30 buses are the flat starts. We note that the system of power flow equations for an IEEE N-bus system has about 2N equations and the same number of unknowns (variables). For example, take the IEEE 6515-bus system (i.e., case6515rte). This power flow problem consists of more than 13,000 equations and also more than 13,000 unknowns. FFHE can effectively solve such large systems of nonlinear equations.

Figure 11:
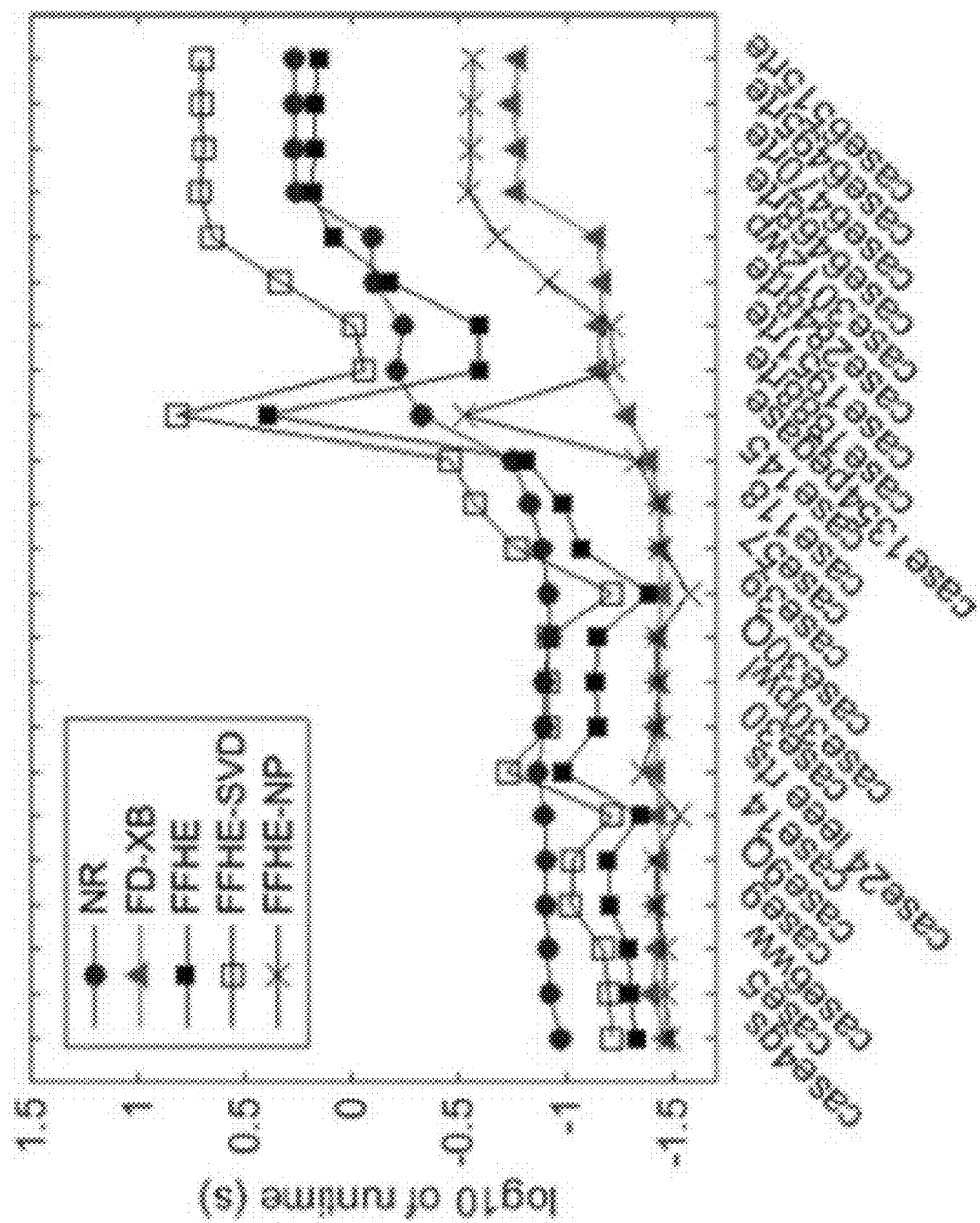

The runtimes needed by the Newton (NR), fast-decoupled (FD-XB), and FFHE methods are summarized and shown in FIG. 11. By comparing the curves marked by filled dots (for NR) and filled squares (for FFHE), respectively, we observe that FFHE needs less time than NR for the 21 test cases. Note that for test systems with 1951 or fewer buses (except for case1354pegase), FFHE needs about 50% 80% of the runtime of NR, while the gap between the runtimes of FFHE and NR becomes less obvious for larger cases. In addition, the (original) HE method is about 10 to 50 times slower than NR, and the gap between HE and NR becomes larger as the system size grows. So, the FFHE method is about 20 times (for small systems) to 50 times (for large systems) faster than the classical holomorphic embedding methods (taking NR as the reference).

Figure 12:
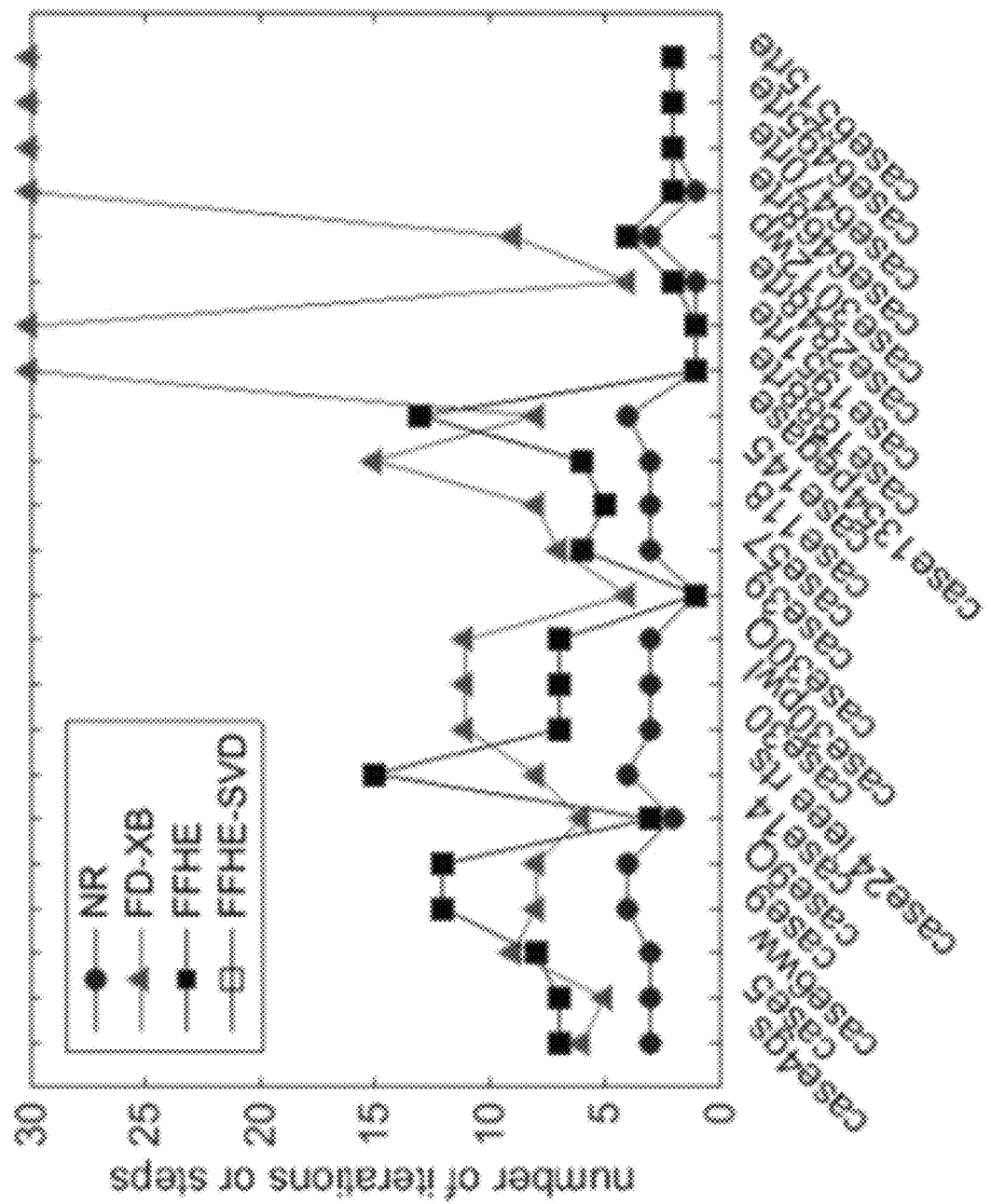

In FIG. 12, we observe that FFHE using system (5) enjoys an advantage in the number of numerical solutions to be computed. FFHE usually computes about 4 or fewer solutions to return a satisfactory PF solution for the test cases with 1000 or more buses. It matches the NR method in the number of iterations where 3 to 5 iterations are needed by NR. However, the classical holomorphic embedding method may need to compute 10, 20, or even more than 60 numerical solutions for these test cases, which are multiple or tens of times more than those required by FFHE.

The effectiveness brought about by stage 4 of FFHE (i.e., to derive a numerical solution by the ratio of determinants) is also shown in FIGS. 11 and 12. The FFHE-SVD refers to a modified FFHE power flow method that composes the numerical solutions by calculating Pade approximants and integrating the singular value decomposition (SVD) technique to enhance its numerical robustness. Numerical results show that the FFHE performs far better than FFHE-SVD, and a speed-up by a factor of 3 or more is observed for medium and large test cases (see FIGS. 11 and 12, the curves marked by filled squares and empty squares).

Regarding the convergence rate, we observe that the max mismatch decreases monotonically as series terms of higher order are computed to derive new approximate solutions in FFHE. Usually, the max mismatch is reduced to 1%, 0.1%, or less (of the initial mismatch) by FFHE, that is, FFHE can reduce the mismatch by 99% or more by computing a new numerical solution $V_{k,q}$.

Figure 13:
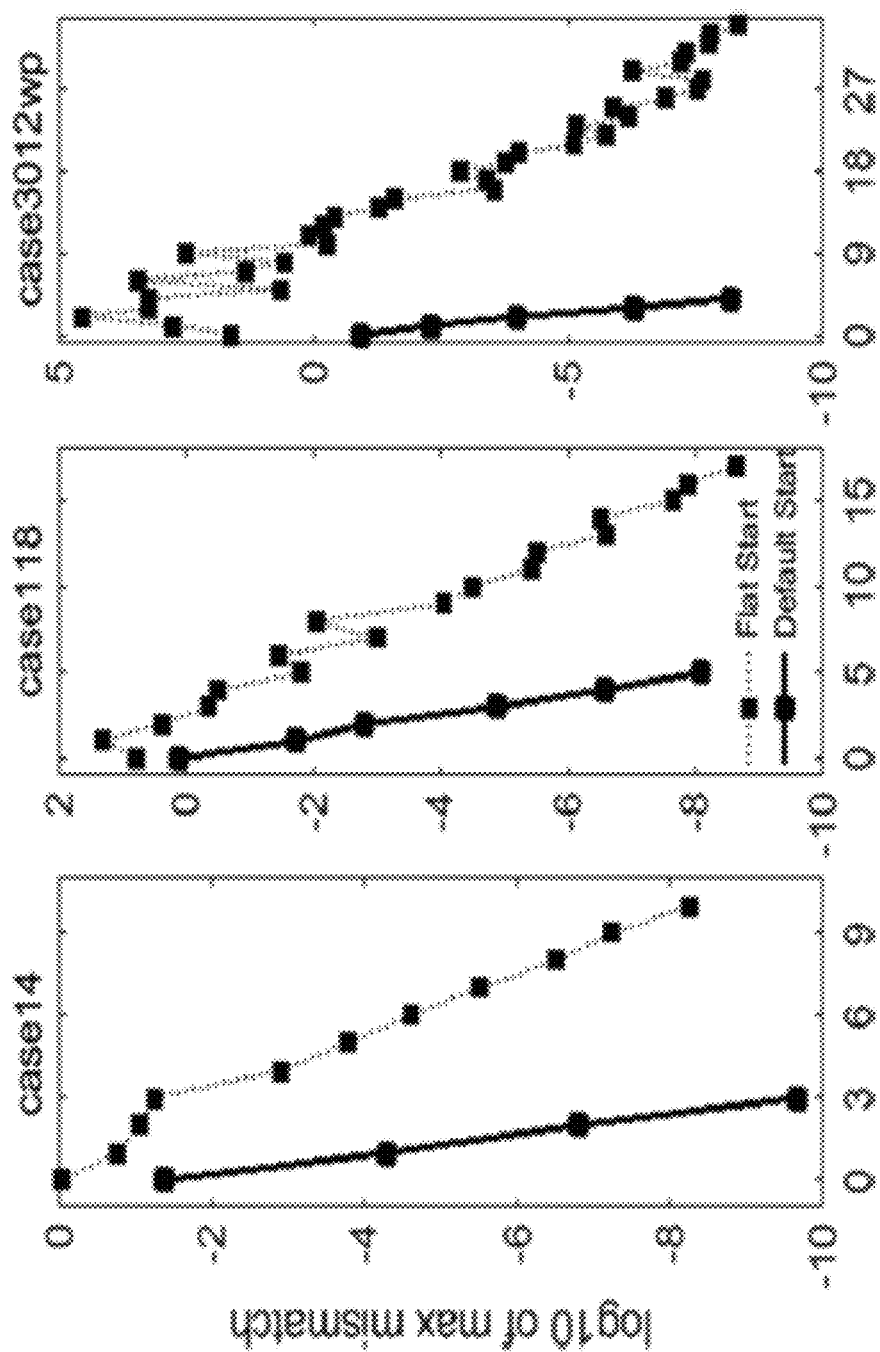

To show the advantages brought about by the flexibility of FFHE in choosing initial guesses, simulation results are shown in FIG. 13 for three test cases. If the default value (provided in MATPOWER) is used as an initial guess, the FFHE method only needs at most 5 steps to converge. On the other hand, if a flat start is used, the method still converges but requires more steps, and the gap between the required numbers of steps may become more obvious as the system size grows. Specifically, the needed number of steps increases from 3 to 10 for case14 since the initial guess uses a flat start instead of the default value, while the number of steps grows by 750% from 4 to 34 for case3012wp. A significant rise in runtime is also observed. Taking easel18 as an example, FFHE needs 5 steps to converge when using the default value as an initial guess, but requires 17 steps if using a flat start, i.e., the number of steps increases by 240%; and the runtime surges by 273.68% from 0.1710 s to 0.6390 s. Note that for case3012wp, the runtime grows by 1336.4% from 1.2170 s to 17.4812 s. To sum up, a different choice of the initial guess really causes dramatic changes in the overall performance, such as the time efficiency and the rate of convergence. Evidently, no single choice of the embedded system or initial point can always yield the best performance in all cases. The flexibility of FFHE thus comes into play and offers a promising alternative.

The above tests are carried out to solve the power flow problem without Q-limits (i.e., neglecting the system operating constraints). To show the performance of FFHE when solving the power flow problem for a realistic system, a number of numerical tests are performed for the power flow problems that take into account the realistic system operating constraints, e.g., considering the Q-limits.

Figure 14:
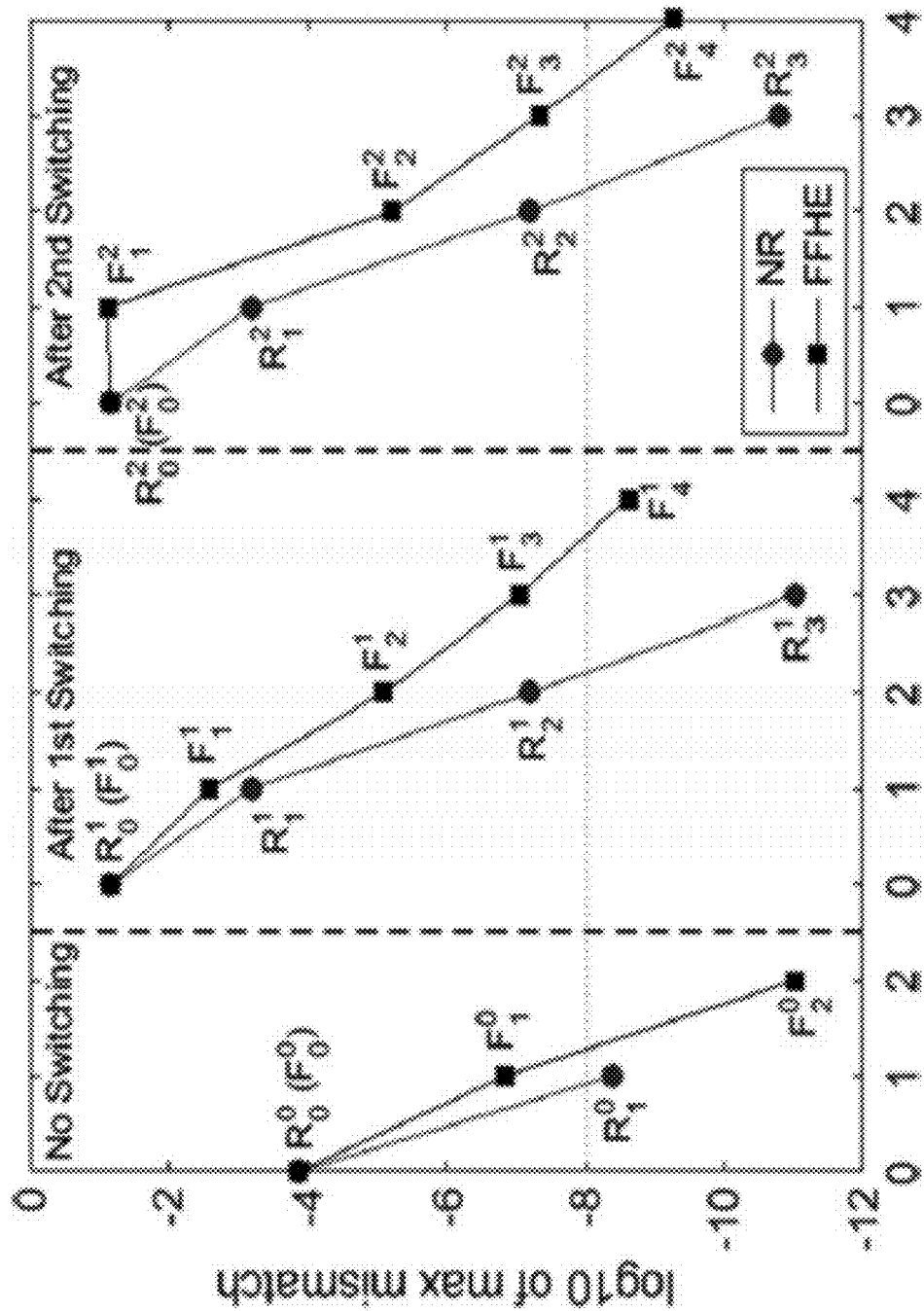

The power system test cases having 118 and 6468 buses with Q-limits are simulated and discussed in the following study. For such small and large systems, the bus-type switching can occur at dozens or hundreds of buses. To better demonstrate the switching mechanism and compare the performance of various methods, the magnitudes of Q-limits (e.g., and are multiplied by a factor of 2 and 8 for the cases with 118 and 6468 buses, respectively. After the modification, the two cases need the bus-type switching at no more than 10 different buses. As shown in FIG. 12, FD-XB diverges when solving large cases. So, only the results of NR and FFHE-based methods for case6468rte are illustrated in FIG. 14, which shows the solving procedure, the rate of convergence, and the difference between methods when Q-limits are enforced. As an example, taking the simulation of case6468rte, the point $R_k^q$ in FIG. 14 marks the value of the maximum mismatch of the kth iteration after qth switching when solving the problem by the NR-based scheme, and $F_k^q$ is the kth approximate solution obtained by the FFHE-based scheme after qth switching where $R_0^q$ and $F_0^q$ are the initial values after the qth switching. Note that NR and FFHE-based schemes both converge after each switching and the PF solutions solved by them before and after the switching (e.g., $R_1^0$ and $F_2^0$, $R_3^1$ and $F_4^1$, $R_3^2$ and $F_4^2$) are almost the same, although the FFHE-based scheme usually needs to compute one more approximate solution than NR, where the difference between the solutions returned by the two schemes has a norm of less than 1.0 e-17, e.g., the difference between the numerical solutions corresponding to the points $R_3^2$ and $F_4^2$, respectively.

Figure 15:
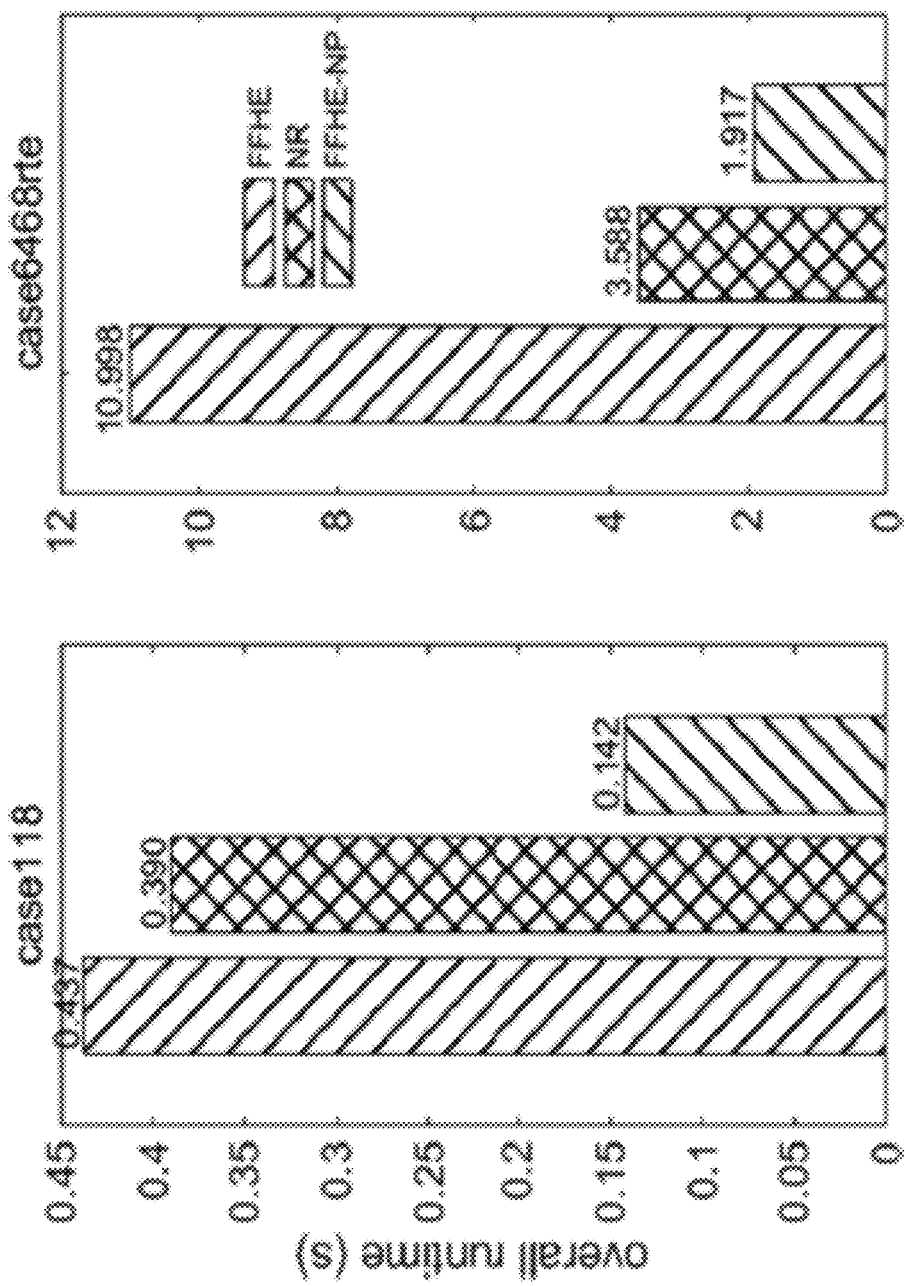

Regarding the required runtime, we observe from FIG. 15 that the FFHE-based method needs 0.4370 s and the NR-based method consumes 0.3900 sin total for case 118, that is, the FFHE-based scheme consumes 12.05% more runtime than the NR-based scheme. If using a metric that excludes the time used by steps 2-3 (see FFHE-NP in FIG. 15), then the FFHE-based method needs 0.1420 s, which is only 36.41% of the overall runtime required by the NR-based method. For case6486rte, the FFHE-based scheme consumes 10.998 s in total, whereas it only requires 1.9170 s if using the new metric. So, the overall runtime needed by the FFHE-based method is 3.065 times the runtime of the NR method, and the ratio is reduced to 0.534=1.917/3.588 if using the above-noted metric. In addition, an HE-based scheme that integrates a bus-type switching mechanism to handle Q-limits has been evaluated on test cases with 118 and 6057 buses, and the evaluation results show that the HE-based scheme is notably less efficient than the NR-based method.

Figure 16:
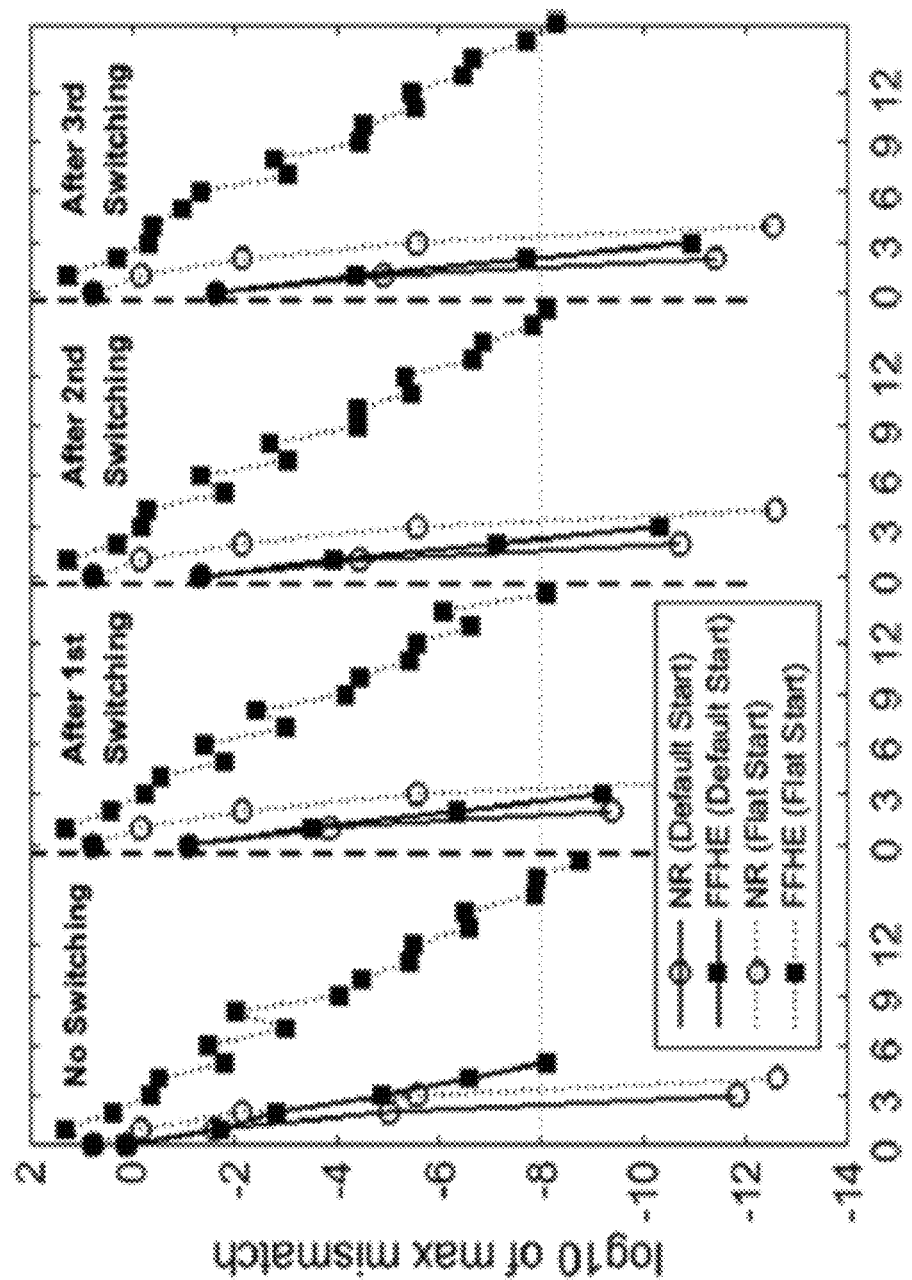

To show the significance of the flexibility when Q-limits are enforced, the numerical results are illustrated in FIG. 16 when the initial point (for the two schemes) after a switching is reset to a flat start and the PF solution before the switching (default start), respectively. Observe that the NR-based scheme always needs no more than 5 iterations to converge, no matter which start the initial point is reset to, by comparing the curves for "NR (Flat Start)" and "NR (Default Start)" in FIG. 16. Nevertheless, the changes are quite significant for the FFHE-based scheme when different initial points are used. Here, the FFHE-based scheme always needs 3 steps to converge after a switching if a default start is used, as shown by curve "FFHE (Default Start)" in FIG. 16. By the curve "FFHE (Flat Start)", we observe that the FFHE-based scheme requires about 16 steps to converge (after a switching) if the initial point is reset to the flat start after the switching. In addition, the runtime needed by FFHE increases by 500% (from 0.0780 s to 0.4680 s) when a flat start takes the place of the default start as the initial point after the first switching, and a similar increase in the required number of steps and runtime is observed for subsequent switching. Note that the number of steps needed by FFHE to converge (when the default start is used as the initial guess) is even one less than the number of iterations required by NR when using the flat start after each switching.

It is to be appreciated that the particular system configurations and parameters referred to in the context of the above-described simulations are examples only, and should not be construed as limiting in any way on the present disclosure.

Other illustrative embodiments involving circuit simulators and DC operating points will now be described.

An understanding of circuit DC behavior is crucial for the analysis and design of electronic circuits. Numerous electronic circuits employ nonlinear elements. DC equations that describe such electronic circuits are systems of nonlinear algebraic equations. The solutions to such equations are called the circuits' DC operating points. Advances in computer-aided design (CAD) tools for circuit simulation have set designers free from the need to perform lengthy and tedious, but often only approximate, calculations to compute circuit currents and voltages. The SPICE circuit simulator has become an industry standard, and many SPICE-like CAD tools are in use today. Nevertheless, the problem of computing the DC operating points of transistor circuits can be a hard task. The exponential nature of the diode-type nonlinearities that model semiconductor devices can cause computational difficulties. Based on the Ebers-Moll transistor model, a general description of an arbitrary nonlinear transistor circuit (containing n/2 bipolar transistors) is given by the equation:

$$0 = F(x) \doteq QT\mathcal{F}(x) + Px + c, \quad (25)$$

The solutions x to this equation are the circuit's DC operating points (voltages). Here, P and Q are n×n matrices, c is a real n-vector, and the real matrix T is a block diagonal matrix with (n/2) 2×2 diagonal blocks of the form $$T_k = \begin{bmatrix} 1 & -\gamma_{k+1} \\ -\gamma_k & 1 \end{bmatrix}.$$

The controlled-source) current-gains $\gamma_k$ lie within the open interval (0,1). The function $\mathcal{F}(x) = (\mathit{f}_1(x_1), \ldots, \mathit{f}_n(x_n))^T$ with $\mathit{f}_k(x_k) = m_k(e^{n_k x_k} - 1)$ for real $m_k$ and $n_k$. The reciprocity condition $m_k \gamma_k = m_{k+1} \gamma_{k+1}$ is satisfied for odd k.

Consider a flexible embedded system, say $$H(x, s) \doteq (1-s) \cdot G(x - x_0) + s \cdot F(x) = \quad (26)$$
$$(1-s) \cdot G(x - x_0) + s \cdot (QTF(x) + Px + c),$$

where s is the embedding parameter, $x_0$ is any given vector that is a solution to $H(x, 0) = 0$ for $s_0 = 0$, and $G \in \mathbb{R}^{n \times n}$ is a matrix. The goal is to solve $H(x, 1) = F(x) = 0$ for $s_1 = 1$.

We consider the series expansion $x_k(s) = \Sigma_{q \geq 0} a_{k,q} s^q$ for $a_q = (a_{1,q}, \ldots, a_{n,q})^T \in \mathbb{C}^n$. Here, $a_{k,0} = x_{k,0}$. Let the series expansion for the function $\mathit{f}_k(x_k) = \Sigma_{q \geq 0} \beta_{k,q} s^q$ with $\beta_q = (\beta_{1,q}, \ldots, \beta_{n,q})^T \in \mathbb{C}^n$ and $\beta_{k,0} = m_k(e^{n_k x_{k,0}} - 1)$. The initial values are thus $$a_0 = x_0, \beta_0 = (m_1(e^{n_1 x_{1,0}} - 1), \ldots, m_n(e^{n_n x_{n,0}} - 1))^T. \quad (27)$$

Clearly, $$\frac{d\mathit{f}_k(x_k(s))}{ds} = m_k \cdot n_k \cdot \frac{dx_k(s)}{ds} \cdot e^{n_k x_k(s)} = n_k \cdot \frac{dx_k(s)}{ds} \cdot (\mathit{f}_k(x_k(s)) + m_k).$$

By replacing $x_k(s)$ and $\mathit{f}_k(x_k(s))$ with the series expansion, it yields the following equation for deriving the series coefficients, say $$\Sigma_{q \geq 0}(q+1)\beta_{k,q+1}s^q = n_k \cdot (\Sigma_{q \geq 0}(q+1)a_{k,q+1}s^q) \cdot (\Sigma_{q \geq 0} \beta_{k,q}s^q + m_k).$$

By equating the coefficients for $s^q$, it shows that $$\beta_{k,1} - n_k \cdot a_{k,1} \cdot (\beta_{k,0} + m_k) = 0,$$

$$(q+1)\beta_{k,q+1} - n_k \cdot \Sigma_{l=0}^{q}(l+1)a_{k,l+1} \cdot \beta_{k,q-l} = 0, q \geq 1. \qquad (28)$$

By inserting series expansions into the embedded equation $H(x, s)=0$, one obtains $$(1-s) \cdot G(\Sigma_{q\geq 0} a_q s^q - x_0) + s \cdot (QT\Sigma_{q\geq 0}\beta_q s^q + P\Sigma_{q\geq 0} a_q s^q + c) = 0, \text{ or}$$

$$\Sigma_{q\geq 0} Ga_q s^q - Gx_0 + \Sigma_{q\geq 0} QT\beta_q s^{q+1} + \Sigma_{q\geq 0} Pa_q s^{q+1} + cs - \Sigma_{q\geq 0} Ga_q s^{q+1} + Gx_0 s = 0.$$

By equating the coefficients for $s^q$ again, we obtain $$Ga_0 - Gx_0 = 0,$$

$$Ga_1 + QT\beta_0 + Pa_0 + c - Ga_0 + Gx_0 = 0,$$

$$Ga_q + QT\beta_{q-1} + Pa_{q-1} - Ga_{q-1} = 0, q \geq 2. \qquad (29)$$

Then, one can directly obtain (without solving a linear equation)

$$a_1 = -G^{-1}(QT\beta_0 + Pa_0 + c - Ga_0 + Gv_0),$$

$$\beta_1 (\beta_{1,1}, \ldots, \beta_{n,1})^T \text{ with}$$

$$\beta_{k,1} = n_k a_{k,1}(\beta_{k,0} + m_k), 1 \leq k \leq n,$$

$$a_q = -G^{-1}(QT\beta_{q-1} + Pa_{q-1} - Ga_{q-1}), q \geq 2$$

$$\beta_q = (\beta_{1,q}, \ldots, \beta_{n,q})^T \text{ with}$$

$$\beta_{k,q} = \frac{n_k}{q} \cdot \sum_{\ell=0}^{q-1} (\ell+1) a_{k,\ell+1} \beta_{k,q-1-\ell}, 1 \leq k \leq n, q \geq 2.$$

In short, the DC operating points to system (25) can be solved by FFHE as follows.

Step 1: To solve a DC operating point by FFHE, one first selects a constant $\varepsilon > 0$ as the error tolerance for the termination criterion, $\omega \in (0,1)$, as the threshold rate of mismatch reduction for the halting criterion and $q_{max}$ and $l_{max}$ as the maximum number of the series coefficient to be computed and the maximum number of iterations allowed, respectively. Initialize the incumbent (halting) number $l=1$.

Step 2: We design a flexible embedded system for (25) with s being the embedding parameter, e.g., $H(x, s)=0$ in (26). Here, for the reference state $s_0=0$, the problem $H(x, s_0)=0$ clearly has a solution $x=x_0$ where $x_0$ can be any point or state specified by the user, while $H(x, s_1)=F(x)=0$ for the target state $s_1=1$. Consider a series expansion for the solution function, e.g., $x(s)=\Sigma_{q\geq 0} a_q(s-s_0)^q$ where $a_q = (a_{1,q}, \ldots, a_{n,q})^T$ is the vector of the q-th order coefficients in the series expansion with $a_0=x_0$ by the solution value $x(s_0)=x_0$. Initialize $q=1$ for the coefficient $a_q$ to be solved.

Step 3: Insert the series expansion into the embedded system to obtain an equation $H(\Sigma_{q\leq 0} a_q(s-s_0)^q, s)=0$, equate the coefficients for $(s-s_0)^q$ as (30), and derive the recursive equation (30) for solving $a_q$ where the right-hand sides of (30) for $a_q$ only depend on $a_l$ and $\beta_l$ for $1 \leq q-1$.

Step 4: Suppose that $a_0, a_1, \ldots, a_q$ have been obtained. We compute a numerical solution $v_{k,q}^l(s_1)$ that approximates the kth element $x_k$ of $x=(x_1, x_2, \ldots, x_k, \ldots)$ as follows:

$$v_{k,q}^l(s_1) = \det(\Psi(\mathbb{L}_k^{\zeta,\eta}(\Delta s)))/\det(\Psi(\mathbb{M}_k^{\zeta,\eta}(\Delta s))) \approx x_k(s_1).$$

Here, $\det(\bullet)$ is the matrix determinant, and the integers $\zeta = \lfloor q/2 \rfloor$ and $\eta = q - \zeta$ such that $\zeta + \eta = q$, where $\aleph$ is the largest integer $\leq \aleph$. Additionally, $\Delta s \doteq (s_1 - s_0)$ is known and fixed.

The map $\Psi$ is linear (having full rank), and the square matrices $\mathbb{L}_k^{\zeta,\eta}(\bullet)$ and $\mathbb{M}_k^{\zeta,\eta}(\bullet)$ are defined in the manner described previously herein.

Step 5: Evaluate the norm of mismatches of (25) after replacing $x_k$ by $v_{k,q}^l(s_1)$, i.e., $\|F(v_q^l(s_1))\|$ for $v_q^l(s_1) = (v_{1,q}^l(s_1), \ldots, v_{n,q}^l(s_1))^T$. If the norm $\|F(v_q^l(s_1))\|$ is less than $\varepsilon$, stop the computation and generate an evaluation report that summarizes the solving process and the results. Otherwise, $\|F(v_q^l(s_1))\|$ is greater than $\varepsilon$, the following two cases are examined.

(a) If $\|F(v_q^l(s_1))\|$ is less than $\omega$ times of the norm of initial mismatches $\|F(x_0)\|$, go to step 6.

(b) Otherwise, if $\|F(v_q^l(s_1))\|$ is greater than $\omega$ times of $\|F(x_0)\|$, go to step 7.

Step 6: Check whether $l < l_{max}$. If $l < l_{max}$, then update $x_0$ by $v_q^l(s_1)$, increase $l$ by 1, and go to step 2. Otherwise, if $l = l_{max}$, then stop the computation and generate an evaluation report stating that it fails to solve the equation.

Step 7: Check whether $q < q_{max}$. If $q < q_{max}$, then increase q by 1 and go to step 3. Otherwise, if $q = q_{max}$, go to step 6.

FIG. 17 illustrates the above-described holomorphic embedding algorithm for determining DC operating points of a circuit. The algorithm in this embodiment comprises a process 1700 having steps 1702 through 1730 which are illustratively executed by processing platform, utilizing processor, memory and network interface components of one or more processing devices of the processing platform.

In step 1702, a system of equations is loaded into the processing platform, illustratively from an operational information database, or from another source, such as a user terminal accessible over a network. The system of equations in the present embodiment illustratively comprises equations for finding DC operating points of an electrical or electronic circuit, such as an integrated circuit, although other systems of equations characterizing other types of physical systems can be used.

In step 1704, the incumbent (halting) number is initialized as $l=1$. This variable is a type of iteration counter, such that the process terminates when a maximum number of iterations has been reached.

The core FFHE operations in this embodiment are collectively denoted by reference numeral 1710, and include steps 1712 through 1726.

In step 1712, a flexible embedded system is designed utilizing the system of equations previously loaded in step 1702. The flexible embedded system is generated using equations of the type described previously.

In step 1714, initial series coefficients $a_0$ are obtained in a straightforward manner and the coefficient number is initialized as $q=1$.

In step 1716, recursive relations are derived between coefficients of the series expansion of $x(s)$ and the series coefficients $a_q$ are calculated using the recursive relations.

In step 1718, a numerical solution is derived, illustratively using a ratio of matrix determinants obtained using the coefficients of the series expansion of $x(s)$ about the starting point $s_0$.

In step 1720, a termination criterion is applied, and if met, the numerical solution becomes the final solution and the process moves to step 1730 as indicated. Otherwise, additional halting and termination criteria of the type described previously are tested in respective additional steps 1722, 1724 and 1726.

More particularly, step 1722 tests the threshold rate of mismatch reduction, step 1724 tests whether or not the maximum series coefficient number $q_{max}$ has been reached, and step 1726 tests whether or not the maximum number of iterations $l_{max}$ has been reached. Each such iteration in this embodiment illustratively involves a different starting point for the flexible embedded system, with the starting point for a given iteration other than the first iteration being a solution generated by the previous iteration.

In step 1730, which is reached when a numerical solution generated in step 1718 satisfies the termination criterion of step 1720 or when a determination is made that the maximum number of iterations has been reached in step 1726. At this point, the core FFHE operations 1710 are terminated and an evaluation report is generated as indicated. As indicated previously herein, additional or alternative automated actions can be performed, such as establishing one or more DC operating points of the circuit based at least in part on the final solution, and configuring the circuit in accordance with the established DC operating points. A given "evaluation report" as that term is broadly used herein can therefore comprise a listing or other information specifying established parameters for the circuit.

It is to be appreciated that the particular process operations and other features of the holomorphic embedding processes illustrated in FIGS. 2, 6 and 17 and described in the detailed process descriptions above are presented by way of example only, and additional or alternative arrangements of features can be used in other embodiments. For example, the ordering of the process operations can be varied in other embodiments, or certain operations may be performed in parallel with other operations.

Illustrative embodiments provide significant advantages relative to conventional approaches.

For example, differing from the traditional holomorphic embedding methods that can only accept certain particular points and states as the initial guess (i.e., the so-called "germ solution"), illustrative embodiments of FFHE use flexible embedded systems that contain a number of tunable parameters and enables the free choice of initial points, the adjustment of search directions, and a speedup of the search during the calculation. As one of the advantages, some embodiments of FFHE can take the freely selected points in the state space or some subsets of interest as the initial guess.

The techniques of illustrative embodiments of FFHE, such as composing numerical solutions for certain points using the ratio of matrix determinants and updating the embedded system using intermediate solutions, can greatly reduce the computing time.

Termination criteria are designed to detect the convergence of the method in general, while halting criteria are usually implemented to control the rate of convergence. In practice, the two types of criteria can be the same or different, depending on the problem structure and the user's needs.

In some embodiments, when solving a system of equations where no prior knowledge about the solution is available, it is particularly useful to update the embedded system using intermediate solutions during the calculation, since the initial point can be far away from the actual solution and many series coefficients may need to be computed to derive a satisfactory numerical solution for the target state (to approximate the actual solution). This can be very time consuming, whereas the intermediate solutions from the updated embedded system can move closer and closer to the actual solution with only the computation of a few (low order) needed series coefficients after each update of the embedded system.

Illustrative embodiments of FFHE enjoy an extremely extended scope of applications. Clearly, FFHE can additionally solve the non-polynomial equations. By parsing the problem formulation, FFHE can efficiently derive the recursive relations for series coefficients and solve problems consisting of various mathematical functions and operators that may utilize only the local analytic continuation but not the global analytic continuation (enjoyed by a class of algebraic equations). This distinguishes FFHE from the traditional holomorphic embedding methods (mainly designed to solve the polynomial power flow equations).

Because FFHE uses a flexible embedded system, e.g., taking any point or state vector as the solution at the reference state $s=s_0$, FFHE can be easily incorporated with other numerical methods or itself by updating the embedded system with the intermediate or final solutions from methods such as Newton's method, FFHE, the trust-region method, the interior point method, and so on. This can bring about substantial improvements in convergence, time efficiency, memory requirement, and so on. However, such advantages are not enjoyed by traditional holomorphic embedding methods at least in part because these conventional methods have only a limited choice of initial points.

Some embodiments compute the ratio of two matrix determinants to directly derive the numerical solution, without spending a great deal of computational resources deriving the rational approximants (as a medium step) as in conventional HE methods. This is another unique feature of FFHE in superior computational efficiency and speed (5 times or more speedup than other HE methods).

We take advantage of FFHE in flexibly selecting the initial point and computational efficiency, and integrate it with certain switching mechanisms to create a novel method for solving the power flow problem with Q-limits, which is hundreds of times faster than other HE methods for the power flow problem with Q-limits.

The above-described advantages are present in illustrative embodiments, but one or more such advantages may not be present in other embodiments. These particular advantages should therefore not be construed as limiting in any way.

As indicated above, the holomorphic embedding algorithms disclosed herein are suitable for use in a wide variety of different control applications. The particular application examples described above are for purposes of illustration only, and should not be construed as limiting in any way.

Like other aspects of the illustrative embodiments disclosed herein, the particular features and functionality of FFHE and other techniques disclosed herein are presented by way of illustrative example only, and a wide variety of alternative features and functionality can be used in other embodiments.

Accordingly, the embodiments described herein are considered illustrative only, and should not be viewed as limited to any particular arrangement of features. For example, those skilled in the art will recognize that alternative processing operations and associated system entity configurations can be used in other embodiments. It is therefore possible that other embodiments may include additional or alternative system elements, relative to the elements of the illustrative embodiments. Also, the particular processing modules, holomorphic embedding algorithms, component controllers and other aspects of the illustrative embodiments can be varied in other embodiments.

It should also be noted that the above-described information processing system arrangements are exemplary only, and alternative system arrangements can be used in other embodiments.

A given client, server, processor or other component in an information processing system as described herein is illustratively configured utilizing a corresponding processing device comprising a processor coupled to a memory. The processor executes software program code stored in the memory in order to control the performance of processing operations and other functionality. The processing device also comprises a network interface that supports communication over one or more networks.

The processor may comprise, for example, a microprocessor, an ASIC, an FPGA, a CPU, an ALU, a DSP, a GPU or other similar processing device component, as well as other types and arrangements of processing circuitry, in any combination. For example, a given precomputation and parameter determination module of a processing device as disclosed herein can be implemented using such circuitry.

The memory stores software program code for execution by the processor in implementing portions of the functionality of the processing device. A given such memory that stores such program code for execution by a corresponding processor is an example of what is more generally referred to herein as a processor-readable storage medium having program code embodied therein, and may comprise, for example, electronic memory such as SRAM, DRAM or other types of random access memory, flash memory, ROM, magnetic memory, optical memory, or other types of storage devices in any combination.

Articles of manufacture comprising such processor-readable storage media are considered embodiments of the invention. The term "article of manufacture" as used herein should be understood to exclude transitory, propagating signals.

Other types of computer program products comprising processor-readable storage media can be implemented in other embodiments.

In addition, embodiments of the invention may be implemented in the form of integrated circuits comprising processing circuitry configured to implement processing operations associated with holomorphic embedding and associated automated component control as well as other related functionality.

Processing devices in a given embodiment can include, for example, computers, servers and/or other types of devices each comprising at least one processor coupled to a memory, in any combination. For example, one or more computers, servers, storage devices or other processing devices can be configured to implement at least portions of a processing platform comprising a holomorphic embedding algorithm and/or a component controller as disclosed herein. Communications between the various elements of an information processing system comprising processing devices associated with respective system entities may take place over one or more networks.

An information processing system as disclosed herein may be implemented using one or more processing platforms, or portions thereof.

For example, one illustrative embodiment of a processing platform that may be used to implement at least a portion of an information processing system comprises cloud infrastructure including virtual machines implemented using a hypervisor that runs on physical infrastructure. Such virtual machines may comprise respective processing devices that communicate with one another over one or more networks.

The cloud infrastructure in such an embodiment may further comprise one or more sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the information processing system.

Another illustrative embodiment of a processing platform that may be used to implement at least a portion of an information processing system as disclosed herein comprises a plurality of processing devices which communicate with one another over at least one network. Each processing device of the processing platform is assumed to comprise a processor coupled to a memory.

Again, these particular processing platforms are presented by way of example only, and an information processing system may include additional or alternative processing platforms, as well as numerous distinct processing platforms in any combination, with each such platform comprising one or more computers, servers, storage devices or other processing devices.

For example, other processing platforms used to implement embodiments of the invention can comprise different types of virtualization infrastructure in place of or in addition to virtualization infrastructure comprising virtual machines. Thus, it is possible in some embodiments that system components can run at least in part in cloud infrastructure or other types of virtualization infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system. Such components can communicate with other elements of the information processing system over any type of network or other communication media.

As indicated previously, components of the system as disclosed herein can be implemented at least in part in the form of one or more software programs stored in memory and executed by a processor of a processing device. For example, certain functionality associated with holomorphic embedding and component control in a processing platform can be implemented at least in part in the form of software.

The particular configurations of information processing systems described herein are exemplary only, and a given such system in other embodiments may include other elements in addition to or in place of those specifically shown, including one or more elements of a type commonly found in a conventional implementation of such a system.

For example, in some embodiments, an information processing system may be configured to utilize the disclosed techniques to provide additional or alternative functionality in other contexts.

It is also to be appreciated that the particular process steps used in the embodiments described above are exemplary only, and other embodiments can utilize different types and arrangements of processing operations. For example, certain process steps shown as being performed serially in the illustrative embodiments can in other embodiments be performed at least in part in parallel with one another.

It should again be emphasized that the embodiments of the invention as described herein are intended to be illustrative only. Other embodiments of the invention can be implemented utilizing a wide variety of different types and arrangements of information processing systems, processing platforms, processing modules, processing devices, processing operations, holomorphic embedding algorithms, physical systems, operating parameters and component controllers than those utilized in the particular illustrative embodiments described herein. In addition, the particular assumptions made herein in the context of describing certain embodiments need not apply in other embodiments. These and numerous other alternative embodiments will be readily apparent to those skilled in the art.

What is claimed is:

1. An apparatus comprising:
   at least one processing device comprising a hardware processor coupled to a memory;
   said at least one processing device being configured:
   to obtain a system of nonlinear equations characterizing a physical system, the physical system comprising an electrical or electronic system;
   to construct an embedded system from the system of nonlinear equations, wherein the embedded system is configurable with any of a plurality of reference states as respective starting points, and wherein constructing the embedded system comprises selecting a particular reference state $s_0$ from the plurality of reference states, the particular reference state $s_0$ providing a corresponding initial solution $x(s_0)=x_0$ for the embedded system in the particular reference state $s_0$, where $x_0$ comprises an adjustable parameter in a designated function utilized to construct the embedded system from the system of nonlinear equations, the adjustable parameter comprising any of a plurality of user-specified values;
   to utilize the embedded system to generate at least one output providing a solution to the system of nonlinear equations;
   to establish one or more operating parameters of the physical system based at least in part on the output generated utilizing the embedded system; and
   to operate at least a portion of the physical system in accordance with the one or more established operating parameters.

2. The apparatus of claim 1 wherein operating said at least a portion of the physical system in accordance with the one or more established operating parameters comprises generating a control signal for controlling at least one component of the physical system in accordance with the one or more established operating parameters.

3. The apparatus of claim 1 further comprising said at least a portion of the physical system, and wherein the physical system comprises an electric power system, the electric power system comprising a plurality of buses including at least one load bus, at least one generator bus and at least one reference bus, and wherein establishing one or more operating parameters of the physical system based at least in part on the output generated utilizing the embedded system comprises establishing at least one of a voltage magnitude of the load bus and a reactive power of the generator bus.

4. The apparatus of claim 1 further comprising said at least a portion of the physical system, and wherein the physical system comprises an integrated circuit, and wherein establishing at least one operating parameter of the physical system based at least in part on the output generated utilizing the embedded system comprises establishing a direct current operating point of the integrated circuit.

5. The apparatus of claim 1 wherein the system of nonlinear equations is of the form $F(x)=0$ where x is a vector of unknowns, and the embedded system is of the form $H(x, s)=0$ where s extends the vector of unknowns x to a parameterized vector function of unknowns $x(s)$, and where $H(x, s_1)=F(x)$ for $s=s_1 \in \mathbb{C}$, where $s_1$ denotes a target state of the embedded system, and $\mathbb{C}$ is the set of complex numbers.

6. The apparatus of claim 5 wherein the initial solution $x(s_0)=x_0$ to $H(x, s_0)=0$ is known or solvable for $s=s_0 \in \mathbb{C} \setminus \{s_1\}$.

7. The apparatus of claim 6 wherein the parameterized vector function of unknowns $x(s)$ is represented as a series expansion in s about $s_0$ by:
   deriving recursive relations between coefficients of the series expansion for $x(s)$;
   constructing a system of linear equations for solving the coefficients; and
   solving the system of linear equations to obtain the coefficients.

8. The apparatus of claim 1 wherein utilizing the embedded system to generate at least one output providing a solution to the system of nonlinear equations comprises directly deriving a numerical solution based at least in part on a ratio of matrix determinants obtained using coefficients of a series expansion of a parameterized vector function of unknowns about a particular one of the starting points.

9. The apparatus of claim 1 wherein utilizing the embedded system to generate at least one output providing a solution to the system of nonlinear equations comprises performing a plurality of iterations using the embedded system configured with respective different starting points, with a first one of the iterations utilizing a first one of the reference states as an initial starting point for the embedded system, and subsequent ones of the iterations utilizing intermediate solutions from respective previous ones of the iterations as respective other ones of the starting points for the embedded system.

10. The apparatus of claim 1 wherein utilizing the embedded system to generate at least one output providing a solution to the system of nonlinear equations comprises:
    obtaining a prospective solution;
    determining if the prospective solution satisfies one or more specified termination criteria;
    responsive to the prospective solution satisfying the one or more specified termination criteria, designating the prospective solution as a final solution and generating the output providing that solution; and
    responsive to the prospective solution not satisfying the one or more specified termination criteria, designating the prospective solution as an intermediate solution, modifying the embedded system using the intermediate solution as another one of the starting points, and utilizing the modified embedded system to obtain another prospective solution.

11. The apparatus of claim 1 wherein an initial starting point for the embedded system is determined by applying a different type of nonlinear equation solver to the system of nonlinear equations to generate the initial starting point.

12. The apparatus of claim 11 wherein the different type of nonlinear equation solver comprises one of a Gauss-Seidel solver and a fast-decoupled Newton solver.

13. The apparatus of claim 1 wherein the system of nonlinear equations comprises a set of power flow equations of an electric power system comprising a plurality of buses including one or more generator buses, one or more load buses and one or more reference buses, the set of power flow equations being subject to Q-limits, where Q denotes reactive power, and wherein utilizing the embedded system to generate at least one output providing a solution to the system of nonlinear equations comprises:

initializing the generator buses as PV buses, where P denotes known real power and V denotes known voltage magnitude;

generating a prospective solution to the set of power flow equations utilizing the embedded system with an initial starting point;

responsive to all of the PV buses satisfying the Q-limits in the prospective solution, designating the prospective solution as a final solution and generating the output providing that solution; and responsive to any of the PV buses not satisfying the Q-limits in the prospective solution, switching those PV buses to PQ buses, where P denotes known real power and Q denotes known reactive power, designating the prospective solution as an intermediate solution, modifying the embedded system using the intermediate solution as another one of the starting points, and utilizing the modified embedded system to obtain another prospective solution to the set of power flow equations.

14. An apparatus comprising:

at least one processing device comprising a hardware processor coupled to a memory;

said at least one processing device being configured:

to obtain a system of nonlinear equations characterizing a physical system, the physical system comprising an electrical or electronic system;

to construct an embedded system from the system of nonlinear equations, wherein the embedded system is configurable with any of a plurality of reference states as respective starting points, and wherein constructing the embedded system comprises selecting a particular reference state $s_0$ from the plurality of reference states, the particular reference state $s_0$ providing a corresponding initial solution $x(s_0)=x_0$ for the embedded system in the particular reference state $s_0$, where $x_0$ comprises an adjustable parameter in a designated function utilized to construct the embedded system from the system of nonlinear equations;

to utilize the embedded system to generate at least one output providing a solution to the system of nonlinear equations;

to establish one or more operating parameters of the physical system based at least in part on the output generated utilizing the embedded system; and to operate at least a portion of the physical system in accordance with the one or more established operating parameters;

wherein the system of nonlinear equations is of the form $F(x)=0$ where x is a vector of unknowns, and the embedded system is of the form $H(x, s)=0$ where s extends the vector of unknowns x to a parameterized vector function of unknowns $x(s)$; and wherein the embedded system is constructed from the system of nonlinear equations $F(x)=0$ based at least in part on the initial solution utilizing one of the following equations:

$H(x,s)=s \cdot F(x)+(1-s) \cdot (x-x_0)$; and $H(x,s)=s \cdot F(x)+(1-s) \cdot (F(x)-F(x_0))$.

15. A method comprising:

obtaining a system of nonlinear equations characterizing a physical system, the physical system comprising an electrical or electronic system;

constructing an embedded system from the system of nonlinear equations, wherein the embedded system is configurable with any of a plurality of reference states as respective starting points, and wherein constructing the embedded system comprises selecting a particular reference state $s_0$ from the plurality of reference states, the particular reference state $s_0$ providing a corresponding initial solution $x(s_0)=x_0$ for the embedded system in the particular reference state $s_0$, where $x_0$ comprises an adjustable parameter in a designated function utilized to construct the embedded system from the system of nonlinear equations, the adjustable parameter comprising any of a plurality of user-specified values;

utilizing the embedded system to generate at least one output providing a solution to the system of nonlinear equations;

establishing one or more operating parameters of the physical system based at least in part on the output generated utilizing the embedded system; and operating at least a portion of the physical system in accordance with the one or more established operating parameters;

wherein the method is performed by at least one processing device comprising a processor coupled to a memory.

16. The method of claim 15 wherein utilizing the embedded system to generate at least one output providing a solution to the system of nonlinear equations comprises performing a plurality of iterations using the embedded system configured with respective different starting points, with a first one of the iterations utilizing a first one of the reference states as an initial starting point for the embedded system, and subsequent ones of the iterations utilizing intermediate solutions from respective previous ones of the iterations as respective other ones of the starting points for the embedded system.

17. The method of claim 15 wherein utilizing the embedded system to generate at least one output providing a solution to the system of nonlinear equations comprises directly deriving a numerical solution based at least in part on a ratio of matrix determinants obtained using coefficients of a series expansion of a parameterized vector function of unknowns about a particular one of the starting points.

18. A computer program product comprising a non-transitory processor-readable storage medium having stored therein program code of one or more software programs, wherein the program code when executed by at least one processing device causes said at least one processing device:

to obtain a system of nonlinear equations characterizing a physical system, the physical system comprising an electrical or electronic system;

to construct an embedded system from the system of nonlinear equations, wherein the embedded system is configurable with any of a plurality of reference states as respective starting points, and wherein constructing the embedded system comprises selecting a particular reference state $s_0$ from the plurality of reference states, the particular reference state $s_0$ providing a corresponding initial solution $x(s_0)=x_0$ for the embedded system in the particular reference state $s_0$, where $x_0$ comprises an adjustable parameter in a designated function utilized to construct the embedded system from the system of nonlinear equations, the adjustable parameter comprising any of a plurality of user-specified values;

to utilize the embedded system to generate at least one output providing a solution to the system of nonlinear equations;

to establish one or more operating parameters of the physical system based at least in part on the output generated utilizing the embedded system; and to operate at least a portion of the physical system in accordance with the one or more established operating parameters.

19. The computer program product of claim 18 wherein utilizing the embedded system to generate at least one output providing a solution to the system of nonlinear equations comprises performing a plurality of iterations using the embedded system configured with respective different starting points, with a first one of the iterations utilizing a first one of the reference states as an initial starting point for the embedded system, and subsequent ones of the iterations utilizing intermediate solutions from respective previous ones of the iterations as respective other ones of the starting points for the embedded system.

20. The computer program product of claim 18 wherein utilizing the embedded system to generate at least one output providing a solution to the system of nonlinear equations comprises directly deriving a numerical solution based at least in part on a ratio of matrix determinants obtained using coefficients of a series expansion of a parameterized vector function of unknowns about a particular one of the starting points.

* * * * *